United States Patent
Ono et al.

(10) Patent No.: US 9,997,075 B2
(45) Date of Patent: Jun. 12, 2018

(54) ROAD SHOULDER-DETECTING SYSTEM AND TRANSPORTATION VEHICLE FOR MINING

(71) Applicant: HITACHI CONSTRUCTION MACHINERY CO., LTD., Tokyo (JP)

(72) Inventors: Yukihiko Ono, Tokyo (JP); Atsushi Watanabe, Tokyo (JP); Hidefumi Ishimoto, Tsuchiura (JP); Koji Fujita, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days. days.

(21) Appl. No.: 15/124,107

(22) PCT Filed: Mar. 4, 2015

(86) PCT No.: PCT/JP2015/056381
§ 371 (c)(1),
(2) Date: Sep. 7, 2016

(87) PCT Pub. No.: WO2015/166705
PCT Pub. Date: Nov. 5, 2015

(65) Prior Publication Data
US 2017/0018188 A1  Jan. 19, 2017

(30) Foreign Application Priority Data

Apr. 28, 2014  (JP) .................................. 2014-093076

(51) Int. Cl.
*G01S 17/89* (2006.01)
*G08G 1/16* (2006.01)
(Continued)

(52) U.S. Cl.
CPC .............. *G08G 1/167* (2013.01); *G01S 17/42* (2013.01); *G01S 17/87* (2013.01); *G01S 17/875* (2013.01);
(Continued)

(58) Field of Classification Search
CPC ......... G08G 1/167; G01S 17/42; G01S 17/87; G01S 17/89; G01S 17/936; G05D 1/024; G05D 2201/021
(Continued)

(56) References Cited

U.S. PATENT DOCUMENTS 6,941,201 B2    9/2005  Sudou
2010/0134011 A1*  6/2010  Kobayashi ............. B60Q 1/085
                                                              315/82

(Continued)

FOREIGN PATENT DOCUMENTS

JP       2001-221620 A       8/2001
JP       2001221620 A   *   8/2001
(Continued)

OTHER PUBLICATIONS machine translation JP2012238230A.*
(Continued)

*Primary Examiner* — Steven Lim
*Assistant Examiner* — Kam Ma
(74) *Attorney, Agent, or Firm* — Mattingly & Malur, PC

(57) ABSTRACT

To provide a road shoulder-detecting system which can accurately measure the orientation of a vehicle relative to a road shoulder and the distance to the road shoulder. The present invention includes road shoulder-detecting units to scan a road surface in front of a vehicle in the traveling direction of the vehicle and detect a road shoulder located on the road surface and a road shoulder-measuring device to measure the orientation of the vehicle relative to the road
(Continued)

shoulder detected by the road shoulder-detecting units and the distance to the road shoulder; and the two road shoulder-detecting units are installed on the traveling direction side of the vehicle. The two road shoulder-detecting units are installed in a higher position than the upper ends of front wheels.

8 Claims, 19 Drawing Sheets

(51) Int. Cl.
  *G01S 17/42*   (2006.01)
  *G01S 17/87*   (2006.01)
  *G01S 17/93*   (2006.01)
  *G05D 1/02*   (2006.01)

(52) U.S. Cl.
  CPC ............ *G01S 17/89* (2013.01); *G01S 17/936* (2013.01); *G05D 1/024* (2013.01); *G05D 2201/021* (2013.01)

(58) Field of Classification Search
  USPC .......................................... 340/905
  See application file for complete search history.

(56) References Cited

U.S. PATENT DOCUMENTS

| | | | |
|---|---|---|---|
| 2011/0115615 A1* | 5/2011 | Luo | B60R 1/00 340/436 |
| 2011/0241865 A1* | 10/2011 | Saito | B60W 50/14 340/439 |
| 2012/0155747 A1* | 6/2012 | Hwang | G06T 7/0075 382/154 |
| 2012/0239257 A1* | 9/2012 | Ichinose | B60P 1/045 701/49 |
| 2013/0261885 A1* | 10/2013 | Hargrave, Jr. | E02F 9/262 701/34.4 |
| 2014/0111369 A1* | 4/2014 | Oh | G01S 15/931 342/52 |
| 2014/0267630 A1* | 9/2014 | Zhong | H04N 13/0203 348/47 |
| 2015/0178884 A1* | 6/2015 | Scholl | G06T 3/0018 348/36 |
| 2015/0227952 A1* | 8/2015 | Dance | G06Q 10/04 705/7.31 |
| 2015/0355333 A1* | 12/2015 | Ono | G01S 17/936 356/4.01 |

FOREIGN PATENT DOCUMENTS

| | | | | |
|---|---|---|---|---|
| JP | 2011018132 A | * | 1/2011 | .............. B60P 1/045 |
| JP | 2012-238230 A | | 12/2012 | |
| JP | 2012238230 A | * | 12/2012 | |

OTHER PUBLICATIONS machine translation JP2001221620A.*
International Search Report of PCT/JP2015/056381 dated Jun. 2, 2015.

* cited by examiner

ROAD SHOULDER-DETECTING SYSTEM AND TRANSPORTATION VEHICLE FOR MINING

TECHNICAL FIELD

The present invention relates to a road shoulder-detecting system which is used, for example, in a transportation vehicle for mining and the transportation vehicle for mining.

BACKGROUND ART

In digging work in a mine, a technique to use an unmanned vehicle capable of traveling autonomously for the purpose of enhanced safety and cost reduction is demanded. As for digging work, in the case of so-called open-pit mining in which digging is done from the earth's surface into the underground in a swirling manner without making a drift to mine minerals near the earth's surface, it is necessary to excavate gravel in the deepest area and transport the excavated gravel to outside the mining site. For transportation of the gravel to outside the mining site, a huge dump truck with a large load capacity or the like is used; however, the amount of transported gravel per unit time is directly related to the progress of mining and thus the gravel must be transported by a dump truck traveling at high speed.

On the other hand, in order to transport a large amount of gravel to outside the mining site efficiently, a plurality of dump trucks must travel outward and homeward many times on a road for transportation and it is important to take countermeasures against collision between dump trucks traveling outward and homeward and tumbling of dump trucks from cliffs.

The related art which reduces collisions during high speed traveling of dump trucks is disclosed in Patent Literature 1. In the travel control apparatus for vehicles disclosed in Patent Literature 1, when another vehicle is absent near the subject vehicle, the subject vehicle is made to travel on a solo traveling course set around the center of the road. Only when the vehicles come closer and should pass by each other, the subject vehicle is made to move to a passing-by course located near a road side at lower speed and allows the other vehicle to travel past and then increases the speed to travel at high speed again while moving back to the solo traveling course.

In Patent Literature 1, when the road width is considered in traveling, the road width and the vehicle position on the road are calculated from course data stored in a course data memory unit and the vehicle position measured by a vehicle position measuring unit such as a GPS.

CITATION LIST

Patent Literature

PATENT LITERATURE 1: U.S. Pat. No. 6,941,201

SUMMARY OF INVENTION

Technical Problem

However, in the travel control apparatus for vehicles disclosed in Patent Literature 1, there is the risk that measurement of the vehicle position by the vehicle position measuring unit might fail due to an obstacle such as a cliff. Furthermore, no consideration is given to a cloud of dust raised by another traveling vehicle, inclination of a vehicle caused by an inclined road surface and an uneven road surface, so such dust, inclination of the vehicle or uneven road surface may make it impossible to detect the distance from the road shoulder to the solo traveling course or the passing-by course and measure the orientation of the vehicle relative to the road shoulder and the distance from the vehicle to the road shoulder.

The present invention has been made in view of the above circumstances of the related art and an object thereof is to provide a road shoulder-detecting system and transportation vehicle for mining which can accurately measure the orientation of the vehicle relative to the road shoulder and the distance to the road shoulder.

Solution to Problem

In order to achieve this object, the invention is characterized by including a road shoulder-detecting unit to scan, in a traveling direction of a vehicle, a road surface in front of the vehicle and detect a road shoulder located on the road surface and a road shoulder-measuring unit to measure an orientation of the vehicle relative to the road shoulder detected by the road shoulder-detecting unit and a distance to the road shoulder, wherein two units of the road shoulder-detecting unit are installed on a traveling direction side of the vehicle.

In the present invention thus structured, as compared with a case that the road shoulder is detected by one road shoulder-detecting unit, the road shoulder-measuring unit can measure the orientation of the vehicle relative to the road shoulder and the distance to the road shoulder, considering the pieces of information detected by the two road shoulder-detecting units in combination or making the pieces of information complement each other and thus the road shoulder-measuring unit can measure the orientation of the vehicle relative to the road shoulder and the distance to the road shoulder with higher accuracy.

Furthermore, the invention is characterized in that the two road shoulder-detecting units are structured to linearly scan a distance to the road surface in front of the vehicle in the traveling direction at every given angle with each of the road shoulder-detecting units as a center and are installed so that a scanning line on the road surface by one of the road shoulder-detecting units and a scanning line on the road surface by the other road shoulder-detecting unit intersect each other.

Generally, when the distance from the vehicle to the road shoulder is short, the possibility of the vehicle coming into contact with the road shoulder is high. On the other hand, when the distance from the vehicle to the road shoulder is long, the possibility of the vehicle coming into contact with the road shoulder is low, so detection of the position and orientation of the road shoulder in a wider area is required. Therefore, in the present invention, an intersection line on the road surface by one of the road shoulder-detecting units to linearly scan the distance to the road surface in front of the vehicle in the traveling direction at every given angle and a scanning line on the road surface by the other road shoulder-detecting unit are made to intersect each other. As a consequence, when the distance from the vehicle to the road shoulder is short, the distance between the road shoulder detection point detected by one road shoulder-detecting unit and the road shoulder detection point detected by the other road shoulder-detecting unit is short and the position and orientation of the road shoulder are detected in this short distance, so the road shoulder can be detected with higher accuracy. On the other hand, when the distance from the vehicle to the road shoulder is long, the distance between the road shoulder detection point detected by one road shoulder-detecting unit and the road shoulder detection point detected by the other road shoulder-detecting unit is long, so road shoulder detection can be made in a wider area (for example, see FIG. 10). Consequently, road shoulder detection can be made appropriately according to the distance from the vehicle to the road shoulder and autonomous traveling can be controlled more appropriately.

The present invention is characterized by further including a memory unit storing a road shoulder shape of a road on which the vehicle travels, as a reference road shoulder shape, in which the road shoulder-measuring unit includes a comparison unit to compare the road shoulder shape detected and calculated by one of the road shoulder-detecting units with the reference road shoulder shape stored in the memory unit and measures the orientation of the vehicle relative to the road shoulder and the distance to the road shoulder on the basis of comparison by the comparison unit.

In the present invention thus structured, the orientation of the vehicle relative to the road shoulder and the distance to the road shoulder are measured by the road shoulder-measuring unit, considering the reference road shoulder shape stored in the memory unit, so the accuracy with which the road shoulder-measuring unit measures the orientation of the vehicle relative to the road shoulder and the distance to the road shoulder can be improved.

Furthermore, the present invention is characterized in that the vehicle includes wheels, and the two road shoulder-detecting units are mounted on the vehicle and installed in a higher position than the tops of the wheels.

In the present invention thus structured, even if a cloud of dust is raised, for example, during traveling of the vehicle or another vehicle, the road shoulder can be detected from above the tops of the wheels by the road shoulder-detecting units. Thus, the road shoulder can be detected by the road shoulder-detecting units more reliably without being seriously affected by the dust.

Furthermore, the present invention is characterized in that the two road shoulder-measuring units take an intersection point of a scanning line on the road surface by the road shoulder-detecting unit and a scanning line on an inclined surface of the road shoulder by the road shoulder-detecting unit as a road shoulder measuring point.

In the present invention thus structured, as compared with a case that in addition to the intersection point of the scanning line on the road surface by the road shoulder-detecting unit and the scanning line on the inclined surface of the road shoulder by the road shoulder-detecting unit, the center in the widthwise direction of the road shoulder is taken as a road shoulder detection point, for example, considering the width of the road shoulder based on the road shoulder shape information, the distance to the road shoulder can be measured by the road shoulder-measuring unit more easily and the orientation of the vehicle relative to the road shoulder can be measured by the road shoulder-measuring unit more accurately by taking the intersection point of the scanning line on the road surface by the road shoulder-detecting unit and the scanning line on the inclined surface of the road shoulder by the road shoulder-detecting unit as a road shoulder measuring point.

Furthermore, the present invention is characterized in that the road shoulder-measuring unit measures the orientation of the vehicle relative to the road shoulder and the distance to the road shoulder on the basis of relative positions of two road shoulder measuring points detected by the two road shoulder-detecting units with respect to the vehicle and the reference road shoulder shape stored in the memory unit.

In the present invention thus structured, the road shoulder-measuring unit can measure the orientation of the vehicle relative to the road shoulder and the distance to the road shoulder with higher accuracy by measuring the orientation of the vehicle relative to the road shoulder and the distance to the road shoulder considering the relative positions of the road shoulder measuring points of the two road shoulder-detecting units with respect to the vehicle and referring to the reference road shoulder shape stored in the memory unit.

Furthermore, the present invention is characterized by including a vehicle body, a road shoulder-detecting unit to scan a road surface in front of the vehicle body in a traveling direction of the vehicle body and detect a road shoulder located on the road surface, and a road shoulder-measuring unit to measure an orientation of the vehicle relative to the road shoulder detected by the road shoulder-detecting unit and a distance to the road shoulder, wherein two units of the road shoulder-detecting unit are installed on a traveling direction side of the vehicle body.

In the invention thus structured, as compared with a case that the road shoulder is detected by one road shoulder-detecting unit, the road shoulder-measuring unit can measure the orientation of the vehicle relative to the road shoulder and the distance to the road shoulder with higher accuracy by measuring the orientation of the vehicle relative to the road shoulder detected by each of the two road shoulder-detecting units and the distance to the road shoulder.

Furthermore, the present invention is characterized by including a road shoulder-detecting unit to scan, in a traveling direction of a vehicle, a road surface in front of the vehicle and detect a road shoulder located on the road surface, a scanning direction changing unit to change a direction in which the road shoulder-detecting unit scans the road surface, a road shoulder-measuring unit to measure an orientation of the vehicle relative to the road shoulder detected by the road shoulder-detecting unit and a distance to the road shoulder, a speed detecting unit to detect a travel speed of the vehicle, and a control unit to control the scanning direction changing unit, wherein two units of the road shoulder-detecting unit are installed on a traveling direction side of the vehicle, the scanning direction changing unit is provided in each of the two road shoulder-detecting units, the two road shoulder-detecting units are structured to linearly scan a distance to the road surface in front of the vehicle in the traveling direction at every given angle with each of the road shoulder-detecting units as a center and are installed so that a scanning line on the road surface by one of the road shoulder-detecting units and a scanning line on the road surface by the other road shoulder-detecting unit intersect each other, and the control unit controls the scanning direction changing unit according to the travel speed of the vehicle detected by the speed detecting unit and shifts an intersection point of a scanning line on the road surface by one of the road shoulder-detecting units and a scanning line on the road surface by the other road shoulder-detecting unit in the traveling direction of the vehicle.

When the travel speed of the vehicle is high, it may be a case that the vehicle travels on a flat road surface, etc. and it is necessary to detect the road shoulder forward in the traveling direction in a wider area rather than the position and orientation of the road shoulder adjacent to the vehicle. On the other hand, when the travel speed of the vehicle is low, it may be a case that the vehicle travels in an area where the travel speed should be decreased, such as a bend, slope or uneven road surface and it is necessary to detect the position and orientation of the road shoulder adjacent to the vehicle accurately and prevent contact with the road shoulder or the like properly. Therefore, in the present invention, for example, if the travel speed of the vehicle detected by the speed measuring unit is high, the control unit controls each scanning direction changing unit to shift forward the intersection point of the scanning line on the road surface by one road shoulder-detecting unit and the scanning line on the road surface by the other road shoulder-detecting unit so that the distance between the road shoulder detection point detected by the one road shoulder-detecting unit and the road shoulder detection point detected by the other road shoulder-detecting unit can be increased and the road shoulder can be detected in a wider area (for example, see FIG. 17). On the other hand, if the travel speed of the vehicle detected by the speed measuring unit is low, the control unit controls each scanning direction changing unit to shift backward the intersection point of the scanning line on the road surface by the one road shoulder-detecting unit and the scanning line on the road surface by the other road shoulder-detecting unit so that the distance between the road shoulder detection point detected by the one road shoulder-detecting unit and the road shoulder detection point detected by the other road shoulder-detecting unit can be decreased and the road shoulder can be detected with higher accuracy. Thus, road shoulder detection can be made appropriately according to the travel speed of the vehicle and autonomous traveling can be controlled more appropriately.

Advantageous Effects of Invention

The present invention is structured so that two road shoulder-detecting units installed on the traveling direction side of the vehicle each scans the road surface and the two road shoulder-detecting units each detects the road shoulder located on the road surface. In the present invention thus structured, as compared with a case that the road shoulder is detected by one road shoulder-detecting unit, the road shoulder-measuring unit can measure the orientation of the vehicle relative to the road shoulder and the distance to the road shoulder, considering the pieces of information detected by the two road shoulder-detecting units in combination or making the pieces of information complement each other and thus the road shoulder-measuring unit can measure the orientation of the vehicle relative to the road shoulder and the distance to the road shoulder accurately. As a consequence, the road shoulder can be detected from the vehicle with higher accuracy and for example, autonomous traveling of the vehicle can be performed more appropriately and accurately. Other objects, elements and effects than the abovementioned will more fully appear from the following detailed description of embodiments.

DESCRIPTION OF EMBODIMENTS

Next, forms for embodying a road shoulder-detecting system according to the present invention will be described referring to drawings.

First Embodiment

Figure 1:
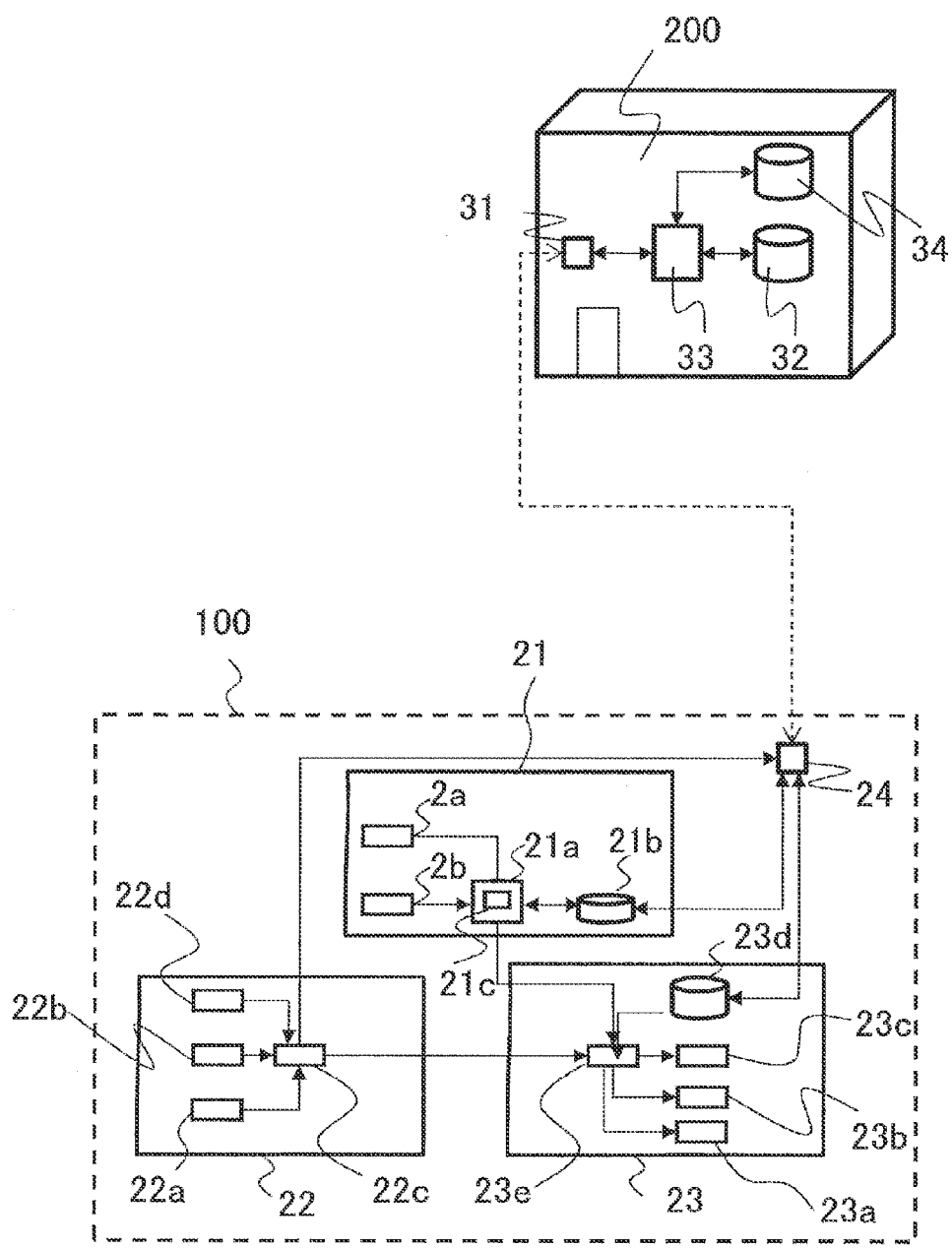
FIG. 1 is a schematic view showing a road shoulder-detecting system according to a first embodiment of the present invention.
Figure 2:
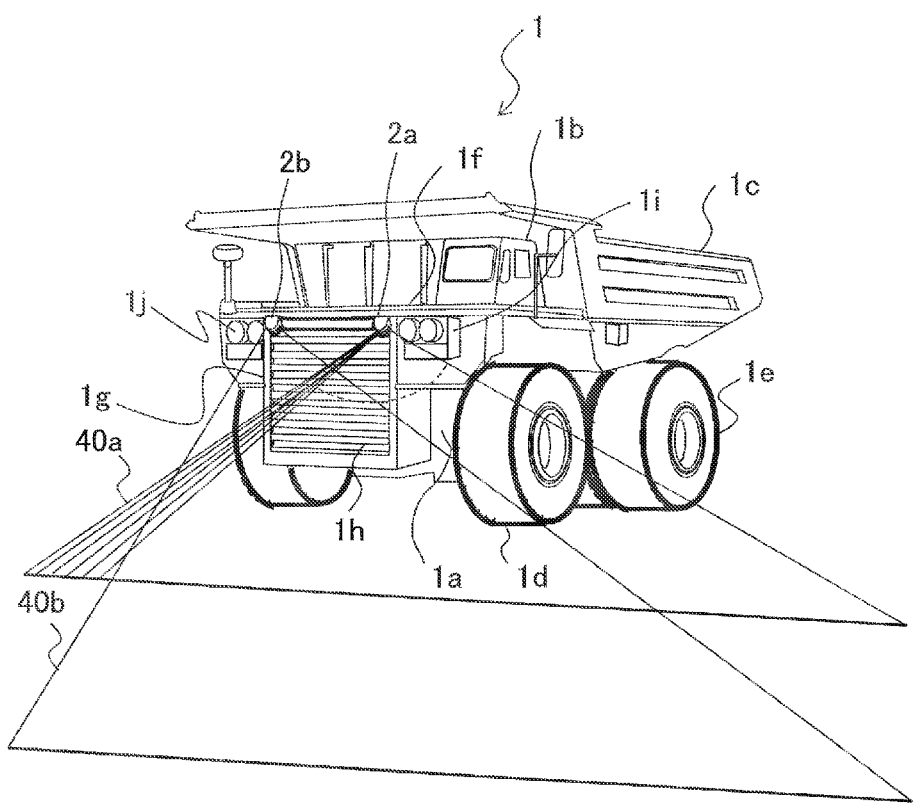
FIG. 2 is a schematic perspective view showing a transportation vehicle for mining for use with the road shoulder-detecting system.
Figure 3:
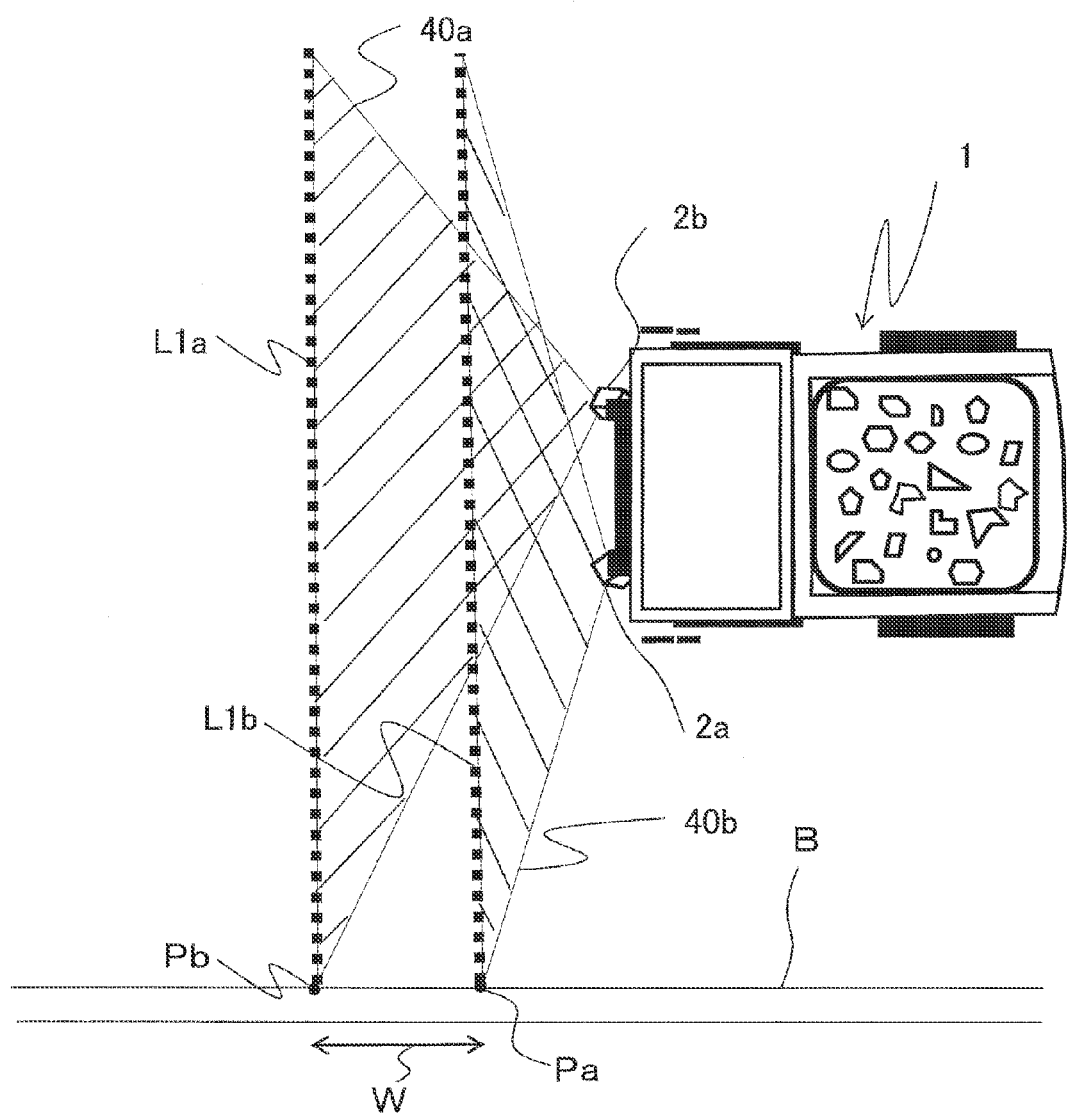
FIG. 3 is a schematic plan view showing the scanning direction of road shoulder-detecting units of the transportation vehicle for mining.
Figure 4:
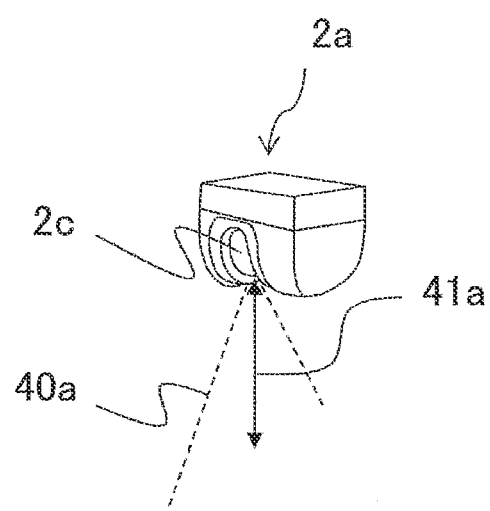
FIG. 4 is a schematic perspective view showing a road shoulder-detecting unit of the transportation vehicle for mining.

The first embodiment is an embodiment in which the scanning directions of two road shoulder-detecting units are parallel. FIG. 1 is a schematic view showing a road shoulder-detecting system 100 according to the first embodiment. FIG. 2 is a schematic perspective view showing an off-road dump truck which is a vehicle 1 as a transportation vehicle for mining for use with the road shoulder-detecting system 100. FIG. 3 is a schematic plan view showing the scanning directions of road shoulder-detecting units 2a, 2b of the vehicle 1. FIG. 4 is a schematic perspective view showing the road shoulder-detecting unit 2a of the vehicle 1.

<Structure>

As shown in FIG. 2, the vehicle 1 is of the unmanned travel type which can travel autonomously on a road surface A of a road preliminarily provided in a mine or the like. A road shoulder B which is an object of detection is provided along the road surface A on a side of the road surface A of the mine. The road shoulder B is an embankment which is located at least on a side where the vehicle 1 travels, for example, on the left in the traveling direction and has prescribed height and width dimensions and it is, for example, 30 m away from the traveling position of the vehicle 1. In the mine, as shown in FIG. 1, a traffic control center 200 having a traffic control system for receiving and sending given information between it and the vehicle 1 is installed and a hydraulic shovel (not shown) is used to load a load such as gravel onto the vehicle 1.

As shown in FIG. 1, the vehicle 1 includes a vehicle body 1a, a driver seat 1b located on the front and upper side of the vehicle body 1a, a vessel 1c as a working area mounted over the vehicle body 1a in an elevatable manner, and left and right front wheels 1d and rear wheels 1e travelably supporting the vehicle body 1a. The front wheels 1d are driven wheels and the rear wheels 1e are drive wheels.

The driver seat 1b is installed on an upper deck 1f which is roughly in the shape of a flat plate, to enable the driver to climb onto the driver seat. The upper deck 1f is located above the tops of the front wheels 1d in a manner to cover the front wheels 1d. Also the upper deck 1f is located on the front side of the vehicle body 1a and extends across the entire width of the vehicle body 1a. A pair of buildings 1g are provided in the center under the upper deck 1f with a prescribed spacing between them and a heat exchanger 1h such as a radiator is installed between the buildings 1g.

An air cleaner 1i is mounted on the outside of each of the pair of buildings 1g. Each air cleaner 1i is installed in a corner partitioned off by the upper deck 1f and building 1g. A cylindrical filter element 1j for trapping dust in the air is attached to each air cleaner 1i. Each filter element 1j is attached to each air cleaner 1i with one end protruding forward from the front end of the upper deck 1f.

Inside each building 1g, a total of two road shoulder-detecting units 2a, 2b are mounted to detect the relative position of a portion of the road shoulder B existing on one side in the traveling direction M of the vehicle body 1a, for example, on the left in the traveling direction. The road shoulder-detecting units 2a, 2b scan the road surface in front of the vehicle body 1a in the traveling direction M of the vehicle body 1a. These road shoulder-detecting units 2a, 2b are installed under the upper deck 1f and on the air cleaners 1i partitioned off by the upper deck 1f and building 1g. Specifically, these road shoulder-detecting units 2a, 2b are located so that the filter elements 1j protruding from the front of the vehicle body 1a are not within scanning planes 40a, 40b where the road shoulder B is detected by the road shoulder-detecting units 2a, 2b. In addition, the road shoulder-detecting units 2a, 2b are located in a higher position than the tops of the front wheels 1d and installed at the same height, on the left and right in the forward direction as the traveling direction of the vehicle body 1a. Concretely, the road shoulder-detecting units 2a, 2b are installed about 4 m above the lower ends of the front wheels 1d. Instead the road shoulder-detecting units 2a, 2b may be installed at different heights.

The road shoulder-detecting units 2a, 2b are laser scanners or the like which can measure the distance to an object and its direction by reflected light from the object by irradiating laser light at every given angle with the road shoulder-detecting units 2a, 2b as centers and scanning the road surface A in a fan-like form. FIG. 4 shows the road shoulder-detecting unit 2a with a detection window 2c, as a concrete example of the road shoulder-detecting units 2a, 2b. As shown in FIG. 2, the road shoulder-detecting units 2a, 2b are installed in a manner that the longitudinal direction of the detection window 2c, 2d is along the left/right direction of the vehicle body 1a and the center of the longitudinal direction of the detection windows 2c, 2d is obliquely oriented downward.

On the other hand, the road shoulder-detecting system 100 includes: a road shoulder-detecting device 21 to measure the orientation of the vehicle body 1a relative to the road shoulder B and the distance to the road shoulder B; a self-position measuring device 22 to measure the position and posture of the vehicle body 1a; a vehicle body motion control device 23 to change the distance of the vehicle body 1a from the road shoulder B and its speed according to the road surface width and presence of an oncoming vehicle; and a communication device 24 for communication with the traffic control center 200.

The road shoulder-detecting device 21 includes: road shoulder-detecting units 2a, 2b; a road shoulder-measuring device 21a as a road shoulder-measuring unit to measure the orientation of the vehicle body 1a relative to the road shoulder B and the distance to the road shoulder B on the basis of the result of measurement by the road shoulder-detecting units 2a, 2b; and a road shoulder memory unit 21b as a memory unit to store road shoulder data concerning the position of the road shoulder in an external coordinate system around the road surface A, namely the shape of the road shoulder itself such as a linear road shoulder or curved road shoulder, as a reference road shoulder shape.

The road shoulder-detecting units 2a, 2b are connected to the road shoulder-measuring device 21a and the road shoulder-measuring device 21a is connected to the road shoulder memory unit 21b. As shown in FIGS. 2 and 3, the road shoulder-detecting units 2a, 2b are set so that intersection lines L1a, L1b as linear scanning lines formed by measuring points on the road surface A reached by laser light radiated from the road shoulder-detecting units 2a, 2b extend along the widthwise direction of the road surface A (road width direction) and the intersection lines L1a, L1b formed by the measuring points on the road surface A by the road shoulder-detecting units 2a, 2b are parallel to each other. Also, the road shoulder-detecting units 2a, 2b scan the measuring points on the road surface A while changing radiation directions 41a, 41b of laser light from the road shoulder-detecting units 2a, 2b at every given predetermined angle, for example, 0.25 degree and measure the distance to the road surface A at each given angle on scanning planes 40a, 40b as laser light scanning planes by the road shoulder-detecting units 2a, 2b. Specifically, the road shoulder-detecting units 2a, 2b have, for example, an angular resolution of 0.25 degree and the interval between measuring points at a point 30 m away is 13 cm.

The road shoulder-measuring device 21a further includes a comparison unit 21c to compare the road shoulder information detected by the road shoulder-detecting units 2a, 2b with the road shoulder data stored in the road shoulder memory unit 21b and measures the orientation of the vehicle body 1a relative to the road shoulder B and the distance to the road shoulder B on the basis of comparison by the comparison unit 21c.

The self-position measuring device 22 includes: a wheel speed measuring unit 22a to measure the rotation speed of, for example, the front wheel 1d of the vehicle body 1a; a steering angle measuring unit 22b to measure the steering angle of a steering wheel (not shown) provided on the driver seat 1b of the vehicle body 1a; and a self-position calculating device 22c to calculate the travel speed of the vehicle body 1a, the angular velocity of the front wheel 1d, the position and posture of the vehicle body 1a in a coordinate system fixed on the ground from the result of rotation speed measurement by the wheel speed measuring unit 22a and the result of steering angle measurement by the steering angle measuring unit 22b. The wheel speed measuring unit 22a is a speed detecting unit to detect the travel speed of the vehicle 1 and it is, for example, a rotation speed sensor or the like to detect the rotation speed of the front wheel 1d. The steering angle measuring unit 22b is a displacement sensor capable of detecting the steering wheel steering angle or the like.

The self-position measuring device 22 includes a self-position correcting device 22d to correct the self-position of the vehicle body 1a. The self-position correcting device 22d is intended to measure the position and posture of the vehicle body 1a with higher accuracy and it is, for example, an inertial measurement unit (IMU), GPS (Global Positioning System) or the like. The wheel speed measuring unit 22a, steering angle measuring unit 22b and self-position correcting device 22d are connected to the self-position calculating device 22c.

The vehicle body motion control device 23 includes: a braking device 23a to decrease or stop the travel speed of the vehicle body 1a; a drive torque limiting device 23b to limit the instructed value of rotation torque for the rear wheel 1e of the vehicle 1; a steering control device 23c to change the distance of the vehicle body 1a from the road shoulder B; a data memory unit 23d storing map data including the travel road route, road width of the road surface A, and information on oncoming vehicles; and a vehicle control device 23e to calculate the amount of braking by the braking device 23a, the amount of limitation by the drive torque limiting device 23b, and the amount of control by the steering control device 23c. The vehicle control device 23e is a control unit which calculates the amount of braking by the braking device 23a, the amount of limitation by the drive torque limiting device 23b, and the amount of control by the steering control device 23c from the map data stored in the data memory unit 23d in order to limit the distance of the vehicle body 1a to the road shoulder B and its travel speed.

The braking device 23a is a mechanical brake which has a mechanical structure, such as a disc brake to brake the rotation of, for example, the rear wheel 1e. The drive torque limiting device 23b is a retarder brake such as an electric brake which applies an electric resistance to the rotation of, for example, the rear wheel 1e to brake it. The map data stored in the data memory unit 23d also includes road shoulder information such as the shape of a road shoulder located on a side of the road. The map data stored in the data memory unit 23d, the self-position information calculated by the self-position calculating device 22c, and the road shoulder information measured by the road shoulder measuring device 21a are entered in the vehicle control device 23e. The vehicle control device 23e is connected to the braking device 23a, drive torque limiting device 23b, and steering control device 23c.

The communication device 24 is connected to the self-position calculating device 22c and sends the information on the self-position of the vehicle 1 calculated by the self-position calculating device 22c to the traffic control center. The communication device 24 is connected to the road shoulder memory unit 21b and data memory unit 23d so that the road shoulder position data stored in the road shoulder memory unit 21b and the map data stored in the data memory unit 23d can be output through the communication device 24.

The traffic control center 200 includes: a communication device 31 to send and receive information between it and the communication device 24 mounted in the vehicle 1; a road shoulder data memory unit 32 to store a road shoulder shape map including the road shoulder shape of the road; a road shoulder shape comparison device 33 as a comparison unit to compare the road shoulder shape information sent from the communication device 24 of the vehicle 1 to the communication device 31, with the road shoulder shape map stored in the road shoulder data memory unit 32; and a change data memory unit 34 to store the road shoulder shape change information of the road shoulder shape information when the road shoulder shape information is found different from the road shoulder map by comparison by the road shoulder shape comparison device 33.

<Road Shoulder Detection Process>

Figure 5A:
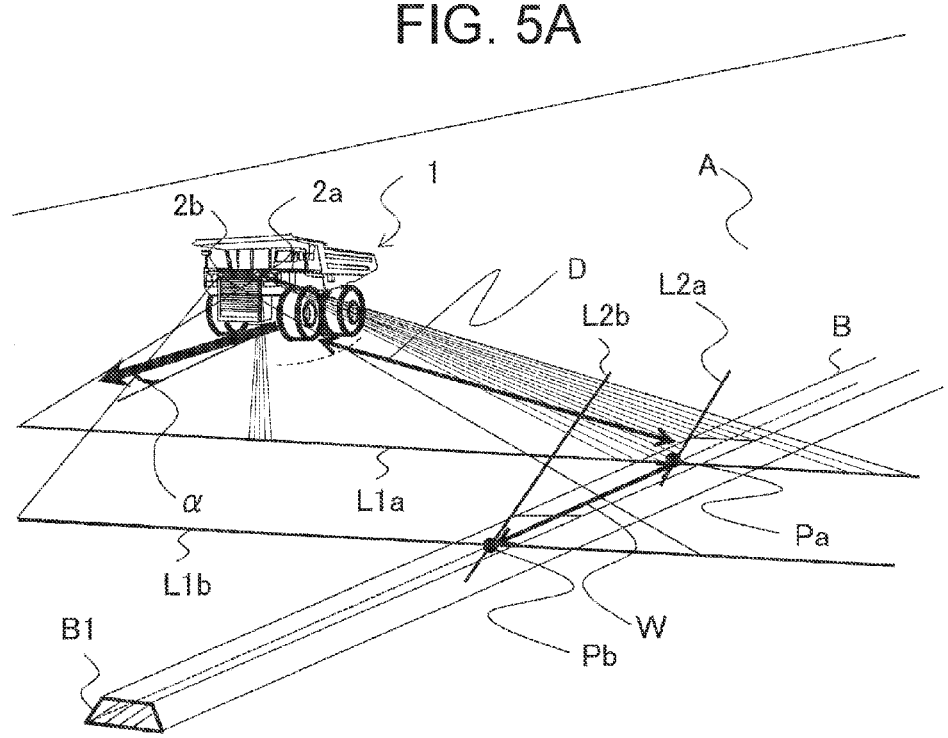
FIG. 5 is a view showing road shoulder detection by the road shoulder-detecting units, in which (a) is a schematic perspective view showing the scanning condition during road shoulder detection and (b) is a graph showing road shoulder detection point P.
Figure 5B:
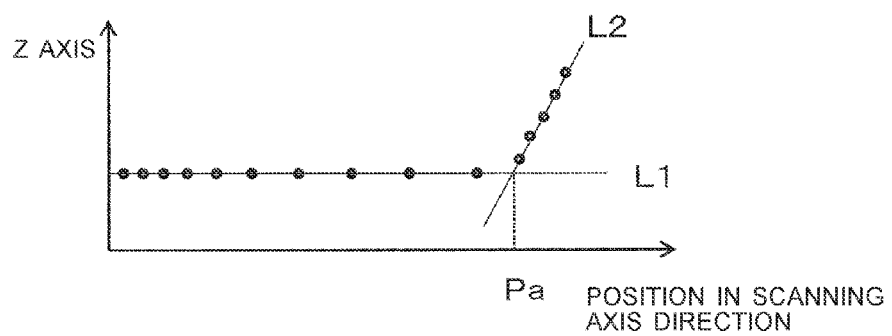
Figure 6:
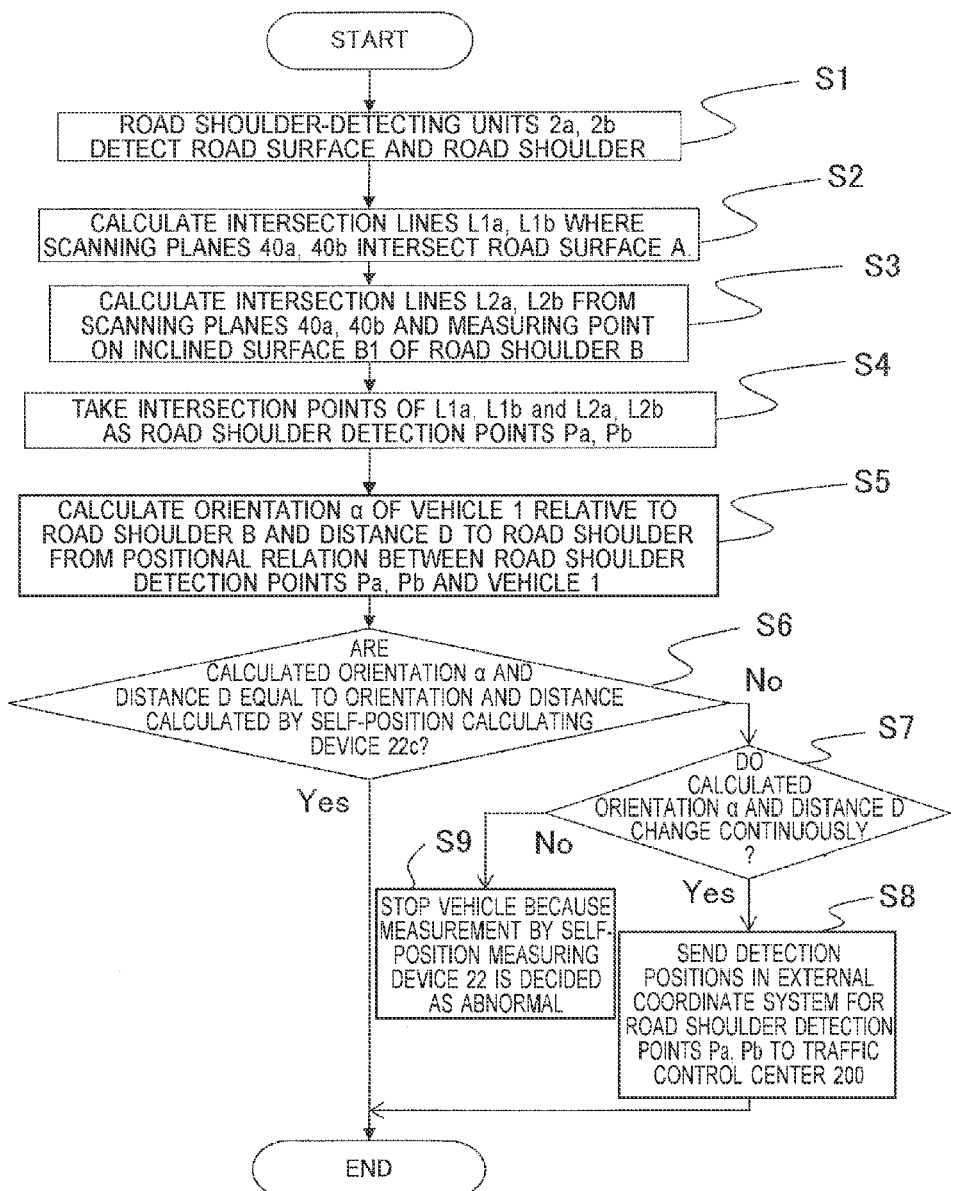
FIG. 6 is a flowchart showing the road shoulder detection process by the transportation vehicle for mining.

Next, the road shoulder detection process by the road shoulder-detecting system 100 will be described referring to FIGS. 5 and 6. FIG. 5 is a view showing road shoulder detection by the road shoulder-detecting units 2a, 2b, in which (a) is a schematic perspective view showing the scanning condition during road shoulder detection and (b) is a graph showing road shoulder detection point P. Here, FIG. 5(a) shows the vehicle 1 which is traveling while detecting the road shoulder B on the road and the broken line in FIG. 5(a) indicates the road shoulder position calculated by the road shoulder-detecting units 2a, 2b and the road shoulder-measuring device 21a. The road shoulder B is not necessarily present on only one side of the vehicle 1 and may be present on both sides of the vehicle 1, and as shown in FIG. 8 and described later, one side may be an inclined surface (slope face) and such inclined surface is also a road shoulder B. FIG. 6 is a flowchart showing the road shoulder detection process by the vehicle 1.

First, the left and right road shoulder-detecting units 2a, 2b detect the road surface A and the road shoulder B and the road shoulder-detecting units 2a, 2b acquire distance measurement data for the road surface A and the road shoulder B (step S1, hereinafter simply referred to as "S1"). From the distance measurement data acquired at S1, as shown in FIGS. 5(a) and 5(b), the road shoulder-measuring device 21a calculates intersection lines L1 (L1a, L1b) where the scanning planes 40a, 40b by the road shoulder-detecting units 2a, 2b intersect the road surface A (S2). At the same time, from a measuring point on an inclined surface B1 of the road shoulder B, the road shoulder-measuring device 21a calculates intersection lines L2 (L2a, L2b) where the scanning planes 40a, 40b by the road shoulder-detecting units 2a, 2b intersect the inclined surface B1 of the road shoulder B (S3).

After that, the road shoulder-measuring device 21a takes the intersection points of the intersection lines L1a, L1b calculated at S2 and the intersection lines L2a, L2b calculated at S3, as road shoulder detection points P(Pa, Pb) (S4). Specifically, as shown in FIG. 5(a), the point where the intersection lines L1a and L2a intersect each other is taken as road shoulder detection point Pa and the point where the intersection lines L1b and L2b intersect each other is taken as road shoulder detection point Pb.

Furthermore, referring to the road shoulder data stored in the road shoulder memory unit 21b, the road shoulder shape in the road shoulder data, the self-position of the vehicle 1 based on the distance measurement data detected by the road shoulder-detecting units 2a, 2b and the road shoulder detection points Pa, Pb are compared and the road shoulder-measuring device 21a calculates orientation α of the vehicle 1 relative to the road shoulder B and distance D to the road shoulder B from the road shoulder shape and the positional relation between the self-position and the road shoulder detection points Pa, Pb, namely the relative positions of the road shoulder detection points Pa, Pb with respect to the vehicle 1 (S5).

Here, the present position of the vehicle 1 is estimated, for example, from a GPS or estimated by the self-position calculating device 22c which calculates the travel speed of the vehicle 1 as corrected by the self-position correcting device 22d, the angular velocity of the front wheel 1d, and the position and posture of the vehicle 1 in the coordinate system fixed on the ground, from the result of rotation speed measurement by the wheel speed measuring unit 22a and the result of steering angle measurement by the steering angle measuring unit 22b. A decision is made as to whether or not the orientation of the vehicle 1 and the distance to the road shoulder calculated from the position and posture of the vehicle 1 as calculated by the self-position calculating device 22c are equal to the orientation α and distance D calculated at S5 (S6).

If at S6 the orientation and distance calculated by the self-position calculating device 22c are decided to be equal to the orientation α and distance D calculated at S5 (Yes), the road shoulder detection process shown in FIG. 6 is ended. On the other hand, if at S6 the orientation and distance calculated by the self-position calculating device 22c are decided to be not equal to the orientation α and distance D calculated at S5 (No), a decision is made as to whether the orientation α and distance D calculated at S5 changes continuously within a predetermined range (S7).

If at S7 the orientation α and distance D calculated at S5 are decided to change continuously within the predetermined range (Yes), the road shoulder-measuring device 21a calculates the detection positions in the external coordinate system for the road shoulder detection points Pa, Pb calculated at S4 and the detection information thus calculated is sent through the communication device 24 to the communication device 31 in the traffic control center 200 (S8). On the other hand, if at S7 the orientation α and distance D calculated at S5 are decided not to change continuously within the prescribed range but to be discontinuous (No), it is decided that measurement by the self-position measuring device 22, namely calculation of the position and posture of the vehicle 1 by the self-position calculating device 22c, is abnormal, and the vehicle control device 23e of the vehicle body motion control device 23 stops traveling of the vehicle 1 or stops the vehicle 1 by controlling the braking device 23a and drive torque limiting device 23b (S9).

<Autonomous Traveling Process>

Figure 7:
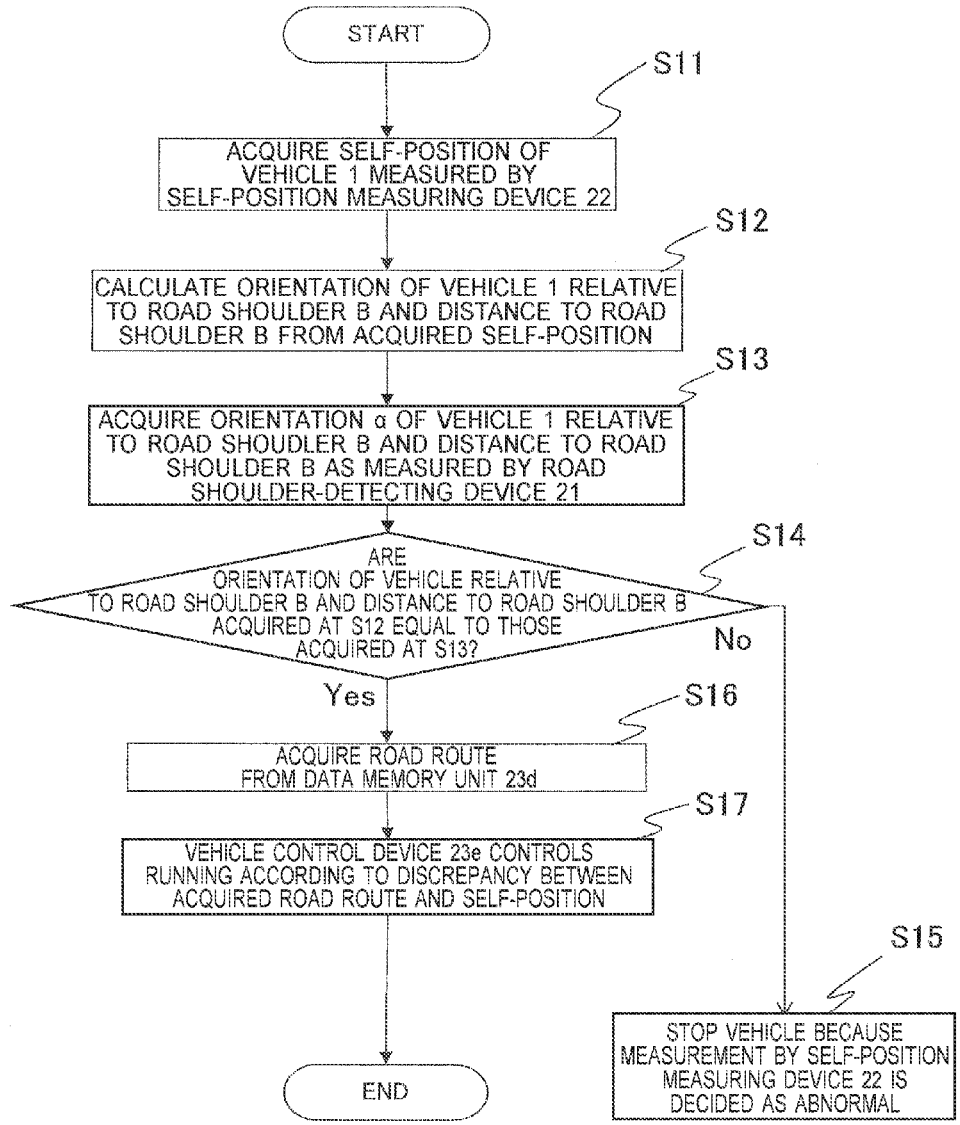
FIG. 7 is a flowchart showing the autonomous traveling process by the transportation vehicle for mining.

Next, the autonomous traveling process by the road shoulder-detecting system 100 will be described referring to FIG. 7. FIG. 7 is a flowchart showing the autonomous traveling process by the vehicle 1.

The vehicle control device 23e of the vehicle body motion control device 23 acquires the information on the self-position of the vehicle 1 as measured by the self-position measuring device 22 (S11). Then, referring to the map data stored in the data memory unit 23d, the orientation relative to the road shoulder B and the distance to the road shoulder B are acquired on the basis of the information on the road width of the road surface A in the map data and the self-position information acquired at S11 (S12).

After that, the vehicle control device 23e acquires information concerning the orientation α of the vehicle 1 relative to the road shoulder B and the distance D from the vehicle 1 to the road shoulder B as calculated by the road shoulder-measuring device 21a of the road shoulder-detecting device 21 (S13). Then, the orientation and distance acquired at S12 and the orientation α and distance D acquired at S13 are compared by the vehicle control device 23e and a decision is made as to whether the calculated orientation α and distance D are equal to the orientation and distance calculated by the self-position calculating device 22c (S14).

If at S14 the calculated orientation α and distance D are decided to be different from the orientation and distance calculated by the self-position calculating device 22c (No), it is decided that measurement by the self-position measuring device 22, namely calculation of the position and posture of the vehicle 1 by the self-position calculating device 22c, is abnormal, and the vehicle control device 23e stops the vehicle 1 by controlling the braking device 23a and drive torque limiting device 23b (S15).

On the other hand, if at S14 the calculated orientation α and distance D are decided to be equal to the orientation and distance calculated by the self-position calculating device 22c (Yes), the map data stored in the data memory unit 23d is acquired (S16). Then, the vehicle control device 23e compares the road route information in the acquired map data with the self-position acquired at S11 and the vehicle control device 23e controls the traveling position of the vehicle 1 to make it a given predetermined traveling position by appropriately controlling the steering control device 23c and the drive torque limiting device 23b, etc. according to the discrepancy between the route information and the self-position (S17).

<Effects>

As explained above, in the road shoulder-detecting system 100 according to the first embodiment, a total of two road shoulder-detecting units 2a, 2b are installed left and right on the front of the vehicle body 1a in its traveling direction and the two road shoulder-detecting units 2a, 2b each detects the distance to the road shoulder B on the left in the traveling direction. The road shoulder-measuring device 21a measures the orientation of the vehicle 1 relative to the road shoulder B and the distance from the vehicle 1 to the road shoulder B on the basis of the detection information detected by the two road shoulder-detecting units 2a, 2b.

In other words, since the total of two road shoulder-detecting units 2a, 2b installed on the front side of the vehicle body 1a each detects the distance to the road shoulder B, as compared with a case that the information detected by one road shoulder-detecting unit is used, the pieces of information detected by the two road shoulder-detecting units 2a, 2b are used and thus the pieces of information detected by the two road shoulder-detecting units 2a, 2b can be considered in combination or made to complement each other or correction can be made using the two pieces of information, so the accuracy with which the road shoulder measuring device 21a measures the orientation of the vehicle 1 relative to the road shoulder B and the distance to the road shoulder B can be improved. Thus, since the accuracy of measurement by the road shoulder-measuring device 21a is improved, detection of the road shoulder from the vehicle 1 can be made with high accuracy and autonomous traveling of the vehicle 1 by the vehicle control device 23e of the vehicle body motion control device 23 can be performed more appropriately and accurately.

Particularly, the road shoulder-measuring device 21a refers to the road shoulder data stored in road shoulder memory unit 21b and the comparison unit 21c compares the road shoulder shape in the road shoulder data, the self-position of the vehicle 1 based on distance measurement data detected by the road shoulder-detecting units 2a, 2b and the road shoulder detection points Pa and Pb, and the road shoulder-measuring device 21a calculates the orientation α of the vehicle 1 relative to the road shoulder B and the distance D to the road shoulder B from the road shoulder shape and the positional relation between the self-position and road shoulder detection points Pa, Pb. In other words, since the road shoulder-measuring device 21a measures the orientation of the vehicle 1 relative to the road shoulder B and the distance to the road shoulder B on the basis of the road shoulder shape in the road shoulder data stored in the road shoulder memory unit 21b, considering the relative positions of the road shoulder detection points Pa, Pb by the two road shoulder-detecting units 2a, 2b with respect to the vehicle 1, so the orientation of the vehicle 1 relative to the road shoulder B and the distance to the road shoulder B can be measured by the road shoulder measuring device 21a with higher accuracy.

Furthermore, the intersection points of the intersection lines L1a, L1b where the scanning planes 40a, 40b by the road shoulder-detecting units 2a, 2b intersect the road surface A and the intersection lines L2a, L2b where the scanning planes 40a, 40b by the road shoulder-detecting units 2a, 2b intersect the inclined surface B1 of the road shoulder B are taken as road shoulder detection points Pa, Pb. In other words, the road shoulder detection points Pa, Pb can be measured and calculated simply by calculating the intersection points of the intersection lines L1a, L1b where the scanning planes 40a, 40b intersect the road surface A and the intersection lines L2a, L2b where the scanning planes 40a, 40b intersect the inclined surface B1 of the road shoulder B, and thus as compared with a case that, for example, the center in the widthwise direction of the road shoulder B is also taken as a road shoulder detection point, considering not only the intersection lines L1a, L1b and intersection lines L2a, L2b but also the width of the road shoulder B, the road shoulder-measuring device 21a can measure the distance to the road shoulder B more easily and the road shoulder-measuring device 21a can measure the orientation of the vehicle 1 relative to the road shoulder B more accurately.

Figure 8A:
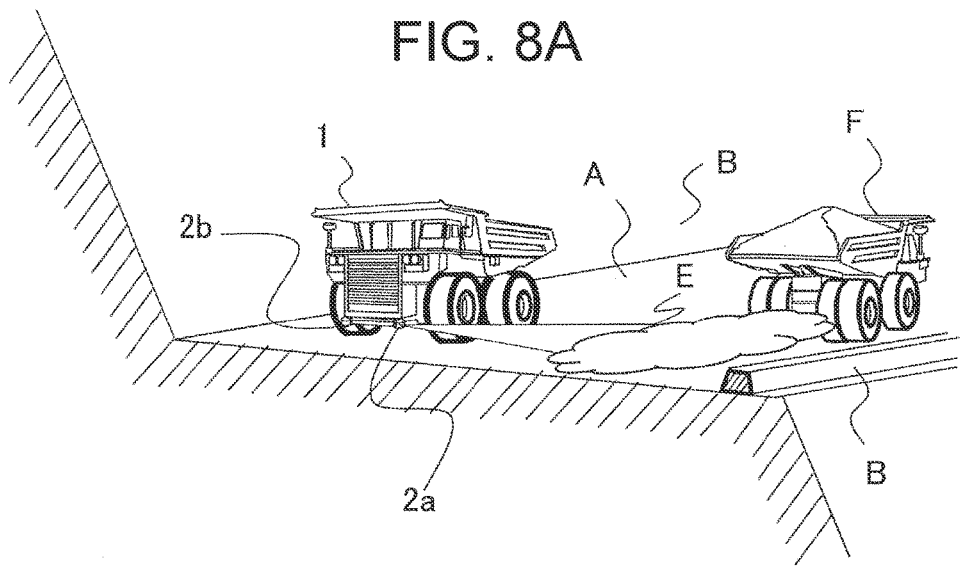
FIG. 8 is a view showing the effect of the road shoulder-detecting units of the transportation vehicle for mining which depends on where they are installed, in which (a) shows a case that the road shoulder-detecting units are installed in a lower position than the wheels and (b) shows a case that the road shoulder-detecting units are installed in a higher position than the wheels.
Figure 8B:
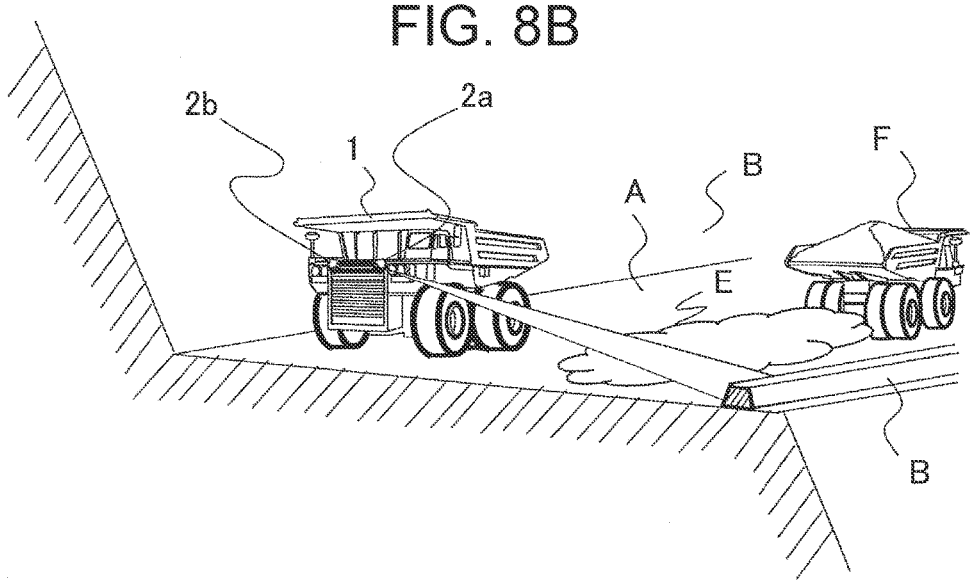

FIG. 8 is a view showing the effect of the road shoulder-detecting units 2a, 2b of the vehicle 1 which depends on where they are installed, wherein (a) shows a case that the road shoulder-detecting units 2a, 2b are installed in a lower position than the front wheels 1d and (b) shows a case that the road shoulder-detecting units 2a, 2b are installed in a higher position than the front wheels 1d. Specifically, if the road is a dry soil, when the vehicle 1 travels on the road, dust E is raised due to rotation of the front wheels 1d or rear wheels 1e of the vehicle 1 and as shown in FIG. 8, dust E raised by an oncoming vehicle F may float between the vehicle 1 and the road shoulder B. In such a situation, if the road shoulder-detecting units 2a, 2b are installed in a low portion of the vehicle 1 as shown in FIG. 8(a), the existence of the dust E between the road shoulder-detecting units 2a, 2b and the road shoulder B may not only make it impossible for the road shoulder-detecting units 2a, 2b to measure the distance to the road shoulder B accurately, but also may stain the detection windows 2c, 2d of the road shoulder-detecting units 2a, 2b with the dust E, resulting in a failure to detect the distance to the road shoulder B.

For this reason, in the vehicle 1 according to the first embodiment, the road shoulder-detecting units 2a, 2b are installed in a higher position than the tops of the front wheels 1d of the vehicle 1 so that the frequency of dust E rising over the road surface A of the road adhering to the detection windows 2c, 2d of the road shoulder-detecting units 2a, 2b is reduced and the distance to the road shoulder B can be detected from above the rising dust E. As a consequence, even if dust E is raised during traveling of not only the oncoming vehicle F but the vehicle 1 or another vehicle, the distance to the road shoulder B can be detected from above the rising dust E by the road shoulder-detecting units 2a, 2b, so the road shoulder can be detected by the road shoulder-detecting units 2a, 2b more reliably. At the same time, the frequency of dust E adhering to the detection windows 2c, 2d of the road shoulder-detecting units 2a, 2b can be reduced, so deterioration in the accuracy with which the road shoulder-detecting units 2a, 2b detect the distance to the road shoulder B can be suppressed.

Furthermore, the road shoulder-detecting units 2a, 2b are located in a position easily accessible from the upper deck 1f, namely under the upper deck 1f and on the air cleaner 1i partitioned off by the upper deck 1f and building 1g, so the road shoulder-detecting units 2a, 2b can be inspected from the upper deck 1f, which ensures maintainability of the road shoulder-detecting units 2a, 2b. A total of two road shoulder-detecting units 2a, 2b are installed at the same height so that the results of detection by the two road shoulder-detecting units 2a, 2b are symmetric. Therefore, as compared with a case that the two road shoulder-detection units 2a, 2b are installed at different heights, the difference in resolution on the road surface A between the two road shoulder-detecting units 2a, 2b can be eliminated and errors in detection by the road shoulder-detecting units 2a, 2b can be reduced.

Second Embodiment

Figure 9:
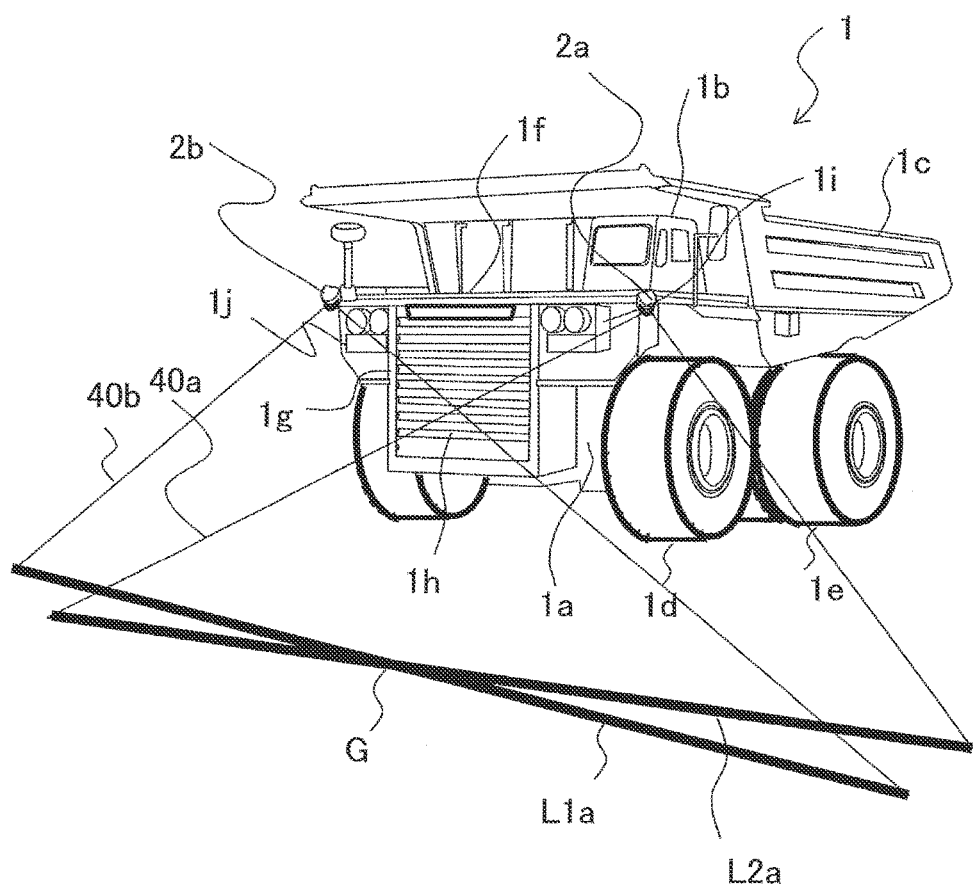
FIG. 9 is a schematic view showing a transportation vehicle for mining according to a second embodiment of the present invention.
Figure 10:
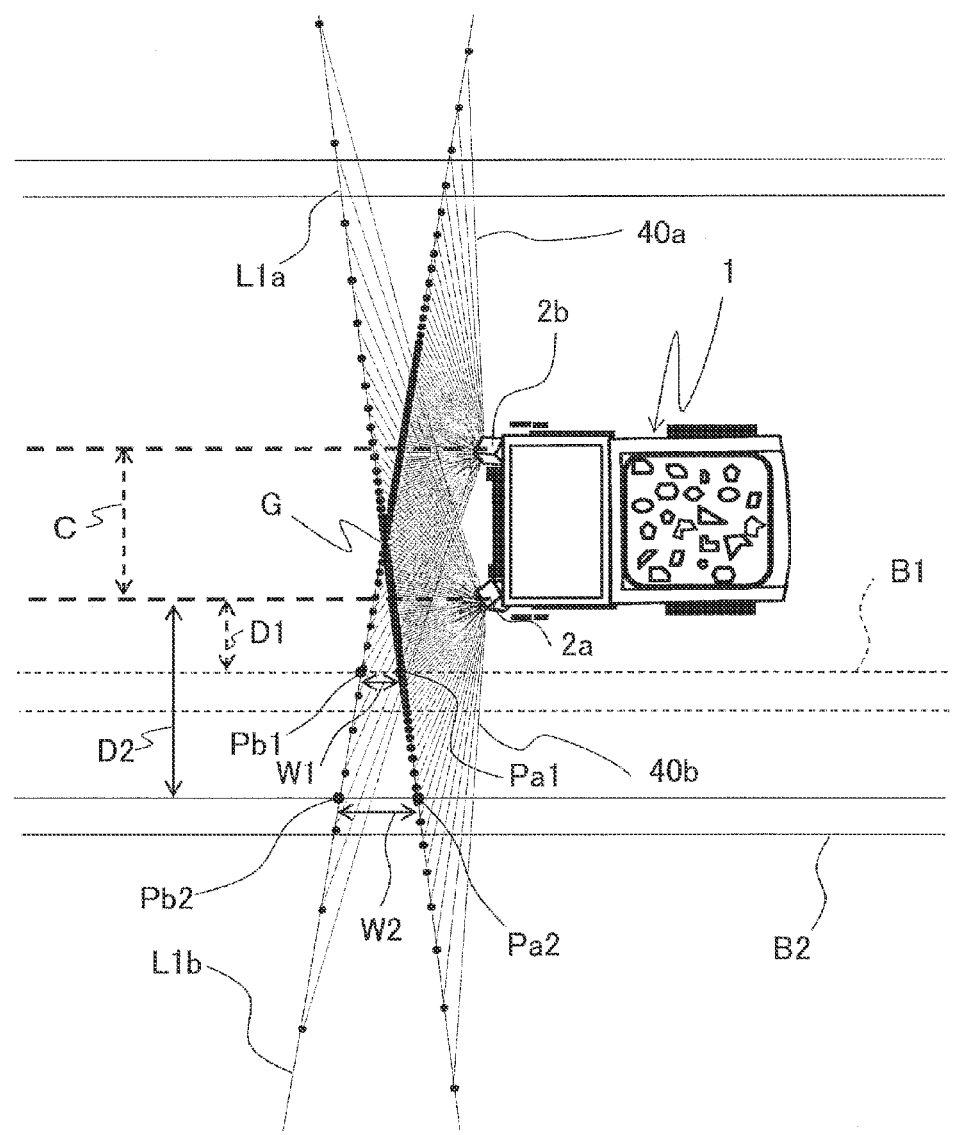
FIG. 10 is a schematic plan view showing the scanning directions of road shoulder-detecting units of the transportation vehicle for mining.
Figure 11:
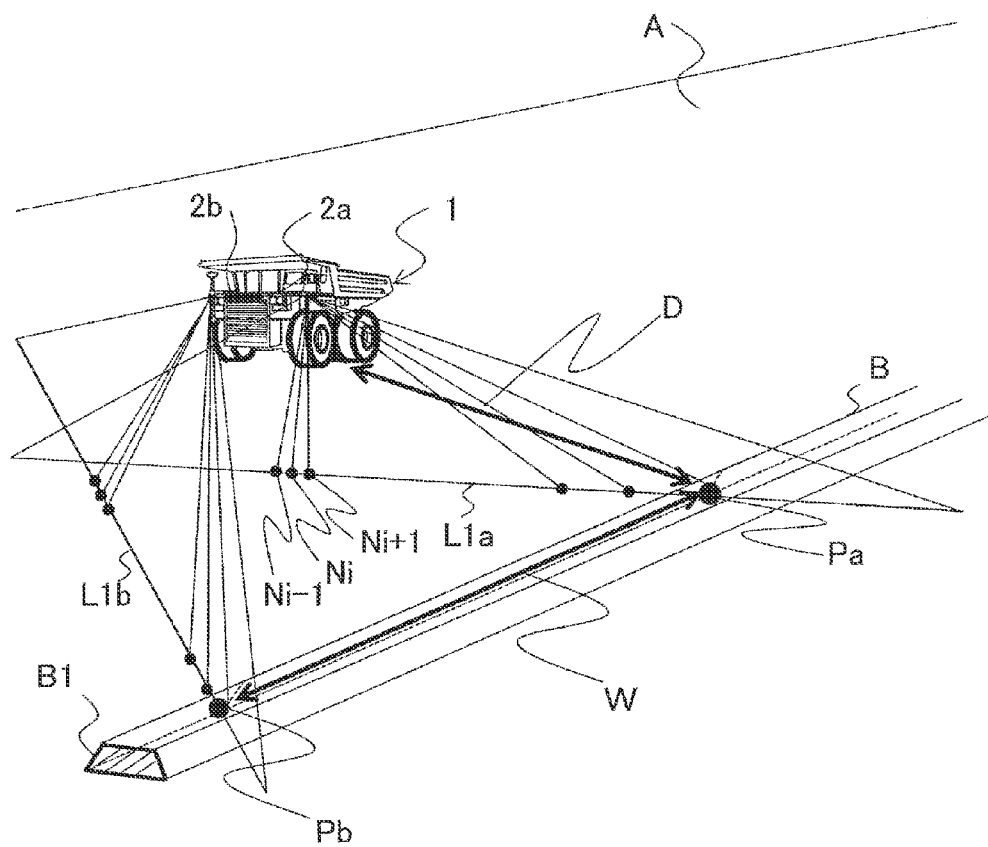
FIG. 11 is a schematic perspective view showing the scanning condition during road shoulder detection by the road shoulder-detecting units of the transportation vehicle for mining.

FIG. 9 is a schematic view showing a vehicle 1 according to a second embodiment of the present invention. FIG. 10 is a schematic plan view showing scanning planes 40a, 40b of road shoulder-detecting units 2a, 2b of the vehicle 1. FIG. 11 is a schematic perspective view showing the scanning condition during road shoulder detection by the road shoulder-detecting units 2a, 2b of the vehicle 1. The difference of the second embodiment from the first embodiment is that whereas in the first embodiment the intersection lines L1a, L1b formed with measuring points on the road surface A by the road shoulder-detecting units 2a, 2b are parallel to each other, in the second embodiment the intersection lines L1a, L1b intersect each other. In the second embodiment, the elements which are the same as or equivalent to those in the first embodiment are designated by the same reference signs.

Since the scanning planes 40a, 40b of the road shoulder-detecting units 2a, 2b are intended to measure the distance at every given angle, as the road shoulder B becomes remoter from the vehicle 1, the detection interval in detection of the distance to the road shoulder B becomes larger. Therefore, in the vehicle 1 according to the second embodiment, the intersection lines L1a, L1b formed with measuring points on the road surface A by the road shoulder-detecting units 2a, 2b are made to intersect each other at a position in front of the vehicle 1. For this reason, in the second embodiment, as shown in FIG. 9, the road shoulder-detecting units 2a, 2b are installed at both ends in the widthwise direction on the front end of the upper deck 1f, and as shown in FIGS. 9 and 10, the scanning directions of the road shoulder-detecting units 2a, 2b are set so that the intersection lines L1a, L1b, where the scanning planes 40a, 40b by the road shoulder-detecting units 2a, 2b intersect the road surface A, intersect each other, and the intersection point G of the intersection lines L1a, L1b passes through the center in the widthwise direction of the vehicle 1 and is located in front of the vehicle 1 in the traveling direction.

As a consequence, as shown in FIGS. 10 and 11, as the distance between the vehicle 1 and the road shoulder B is larger, the distance between road shoulder measuring points Ni and Ni+1 at every interval of scanning by the road shoulder-detecting units 2a, 2b is larger, and also distance W between the road shoulder detection point Pa detected by one road shoulder-detecting unit 2a and the road shoulder detection point Pb detected by the other road shoulder-detecting unit 2b is larger. In other words, the interval between measuring points by laser irradiation by the road shoulder-detecting units 2a, 2b at every given angle increases according to the distance to the road shoulder B and similarly the distance W between the road shoulder detection points Pa and Pb also increases. By contrast, in the first embodiment, the intersection lines L1a, L1b formed with measuring points on the road surface A by the road shoulder-detecting units 2a, 2b are parallel to each other and thus as shown in FIG. 3, the distance W between the road shoulder detection points Pa and Pb remains unchanged or constant, though the interval between measuring points by laser irradiation by the road shoulder-detecting units 2a, 2b at every given angle increases according to the distance to the road shoulder B.

Generally, when distance D from the vehicle 1 to the road shoulder B is relatively short (road shoulder B1 indicated by the broken lines in FIG. 10), distance D1 from the vehicle 1 to the road shoulder B1 is small and the possibility of the vehicle 1 coming into contact with the road shoulder B1 is high, so the position and orientation of the road shoulder B1 must be detected accurately in front of and adjacently to the vehicle 1. On the other hand, when distance D from the vehicle 1 to the road shoulder B2 is relatively long (road shoulder B2 indicated by the solid lines in FIG. 10), distance D2 from the vehicle 1 to the road shoulder B2 is large and the possibility of the vehicle 1 coming into contact with the road shoulder B2 is low, so detection of the position and orientation of the road shoulder B2 in a wider area is required rather than high detection accuracy.

Therefore, as in the second embodiment, when the intersection lines L1a, L1b formed with measuring points on the road surface A by the road shoulder-detecting units 2a, 2b intersect each other in front of the vehicle 1, if distance D1 from the vehicle 1 to the road shoulder B1 is short as shown in FIG. 10, distance W1 between the road shoulder detection point Pa1 by the road shoulder-detecting unit 2a and the road shoulder detection point Pb1 by the road shoulder-detecting unit 2b is small and the position and orientation of the road shoulder B1 are detected in this small distance W1, so the road shoulder B1 can be detected in front of and adjacently to the vehicle 1 more accurately. On the other hand, if distance D2 from the vehicle 1 to the road shoulder B2 is long, distance W2 between the road shoulder detection point Pa2 by the road shoulder-detecting unit 2a and the road shoulder detection point Pb2 by the road shoulder-detecting unit 2b is large, and orientation α of the vehicle 1 relative to the road shoulder B2 can be measured, considering the orientation α of the road shoulder B2 between the road shoulder detection points Pa2 and Pb2 more distant from each other forward in the traveling direction, so road shoulder detection can be made, considering the road shoulder B2 in a wider area. Consequently, road shoulder detection can be made appropriately according to distance D from the vehicle 1 to the road shoulder B and autonomous traveling of the vehicle 1 can be controlled more appropriately.

Third Embodiment

Figure 12:
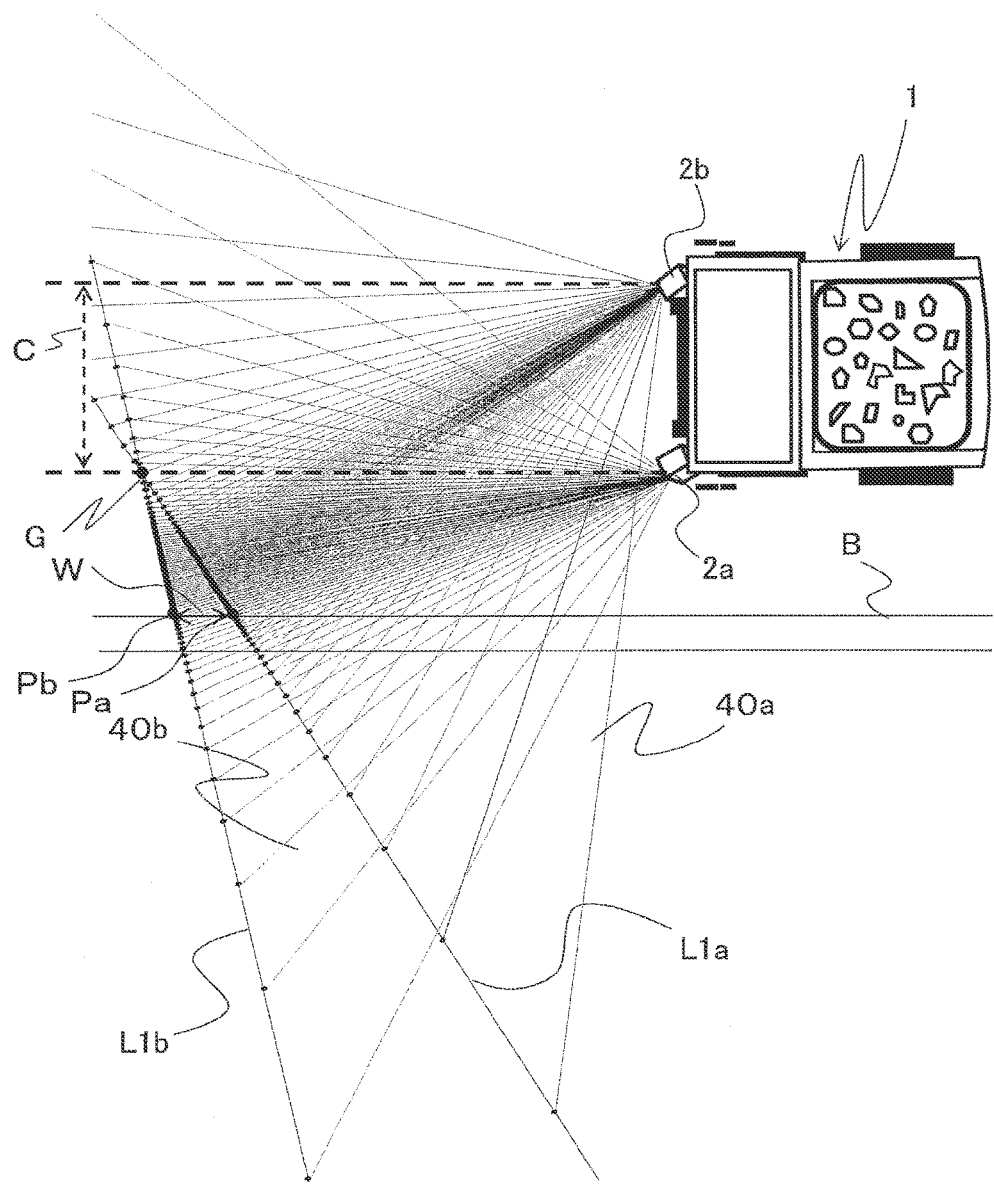
FIG. 12 is a schematic plan view showing the scanning directions of road shoulder-detecting units of a transportation vehicle for mining according to a third embodiment of the present invention.

FIG. 12 is a schematic plan view showing the scanning directions of road shoulder-detecting units 2a, 2b of a vehicle 1 according to a third embodiment of the present invention. The difference of the third embodiment from the second embodiment is that whereas in the second embodiment the intersection lines L1a, L1b formed with measuring points on the road surface A by the road shoulder-detecting units 2a, 2b are set so as to intersect each other in the center in front of the vehicle 1, in the third embodiment the intersection lines L1a, L1b are set so as to intersect each other at a position nearer to the road shoulder B than the center in front of the vehicle 1. In the third embodiment, the elements which are the same as or equivalent to those in the second embodiment are designated by the same reference signs.

In the third embodiment, as shown in FIG. 12, the intersection lines L1a and L1b, where the scanning planes 40a, 40b by the road shoulder-detecting units 2a, 2b intersect the road surface A, intersect each other and the scanning directions of the road shoulder-detecting units 2a, 2b are set so that intersection point G1 of the intersection lines L1a and L1b is on the side of the road surface A where the vehicle 1 travels, for example, in the case of left-hand traffic, more leftward than the center in the widthwise direction of the vehicle 1. Furthermore, the intersection point G1 is set so as to be inside both sides of the vehicle body 1a, specifically within interval C between the road shoulder-detecting units 2a, 2b and nearer to the road shoulder B located on the traveling side.

As explained above, in the third embodiment, the scanning directions of the road shoulder-detecting units 2a, 2b are set so that the intersection lines L1a, L1b formed with measuring points on the road surface A by the road shoulder-detecting units 2a, 2b intersect each other within the interval C between the road shoulder-detecting units 2a, 2b and at a position nearer to the road shoulder B on the traveling side than to the center in front of the vehicle 1. Specifically, the measuring points on the road surface A by the road shoulder-detecting units 2a, 2b cannot be within the interval C between the road shoulder-detecting units 2a, 2b, so if the intersection point G1 of the intersection lines L1a, L1b is within the interval C between the road shoulder-detecting units 2a, 2b, distance W between the road shoulder detection point Pa by the road shoulder-detecting unit 2a and the road shoulder detection point Pb by the road shoulder-detecting unit 2b can be decreased by bringing the measuring points on the road surface A by the road shoulder-detecting units 2a, 2b, namely the scanning directions, near to the road shoulder B as the object of detection, and the position and orientation of the road shoulder B is detected in this small distance W, so a nearer portion of the road shoulder B in front of the vehicle 1 can be detected with high accuracy. At the same time, by bringing the intersection point G1 near to the road shoulder B, the range of scanning by the road shoulder-detecting units 2a, 2b can be narrowed and the angle and range of scanning by the road shoulder-detecting units 2a, 2b can be decreased.

Fourth Embodiment

Figure 13:
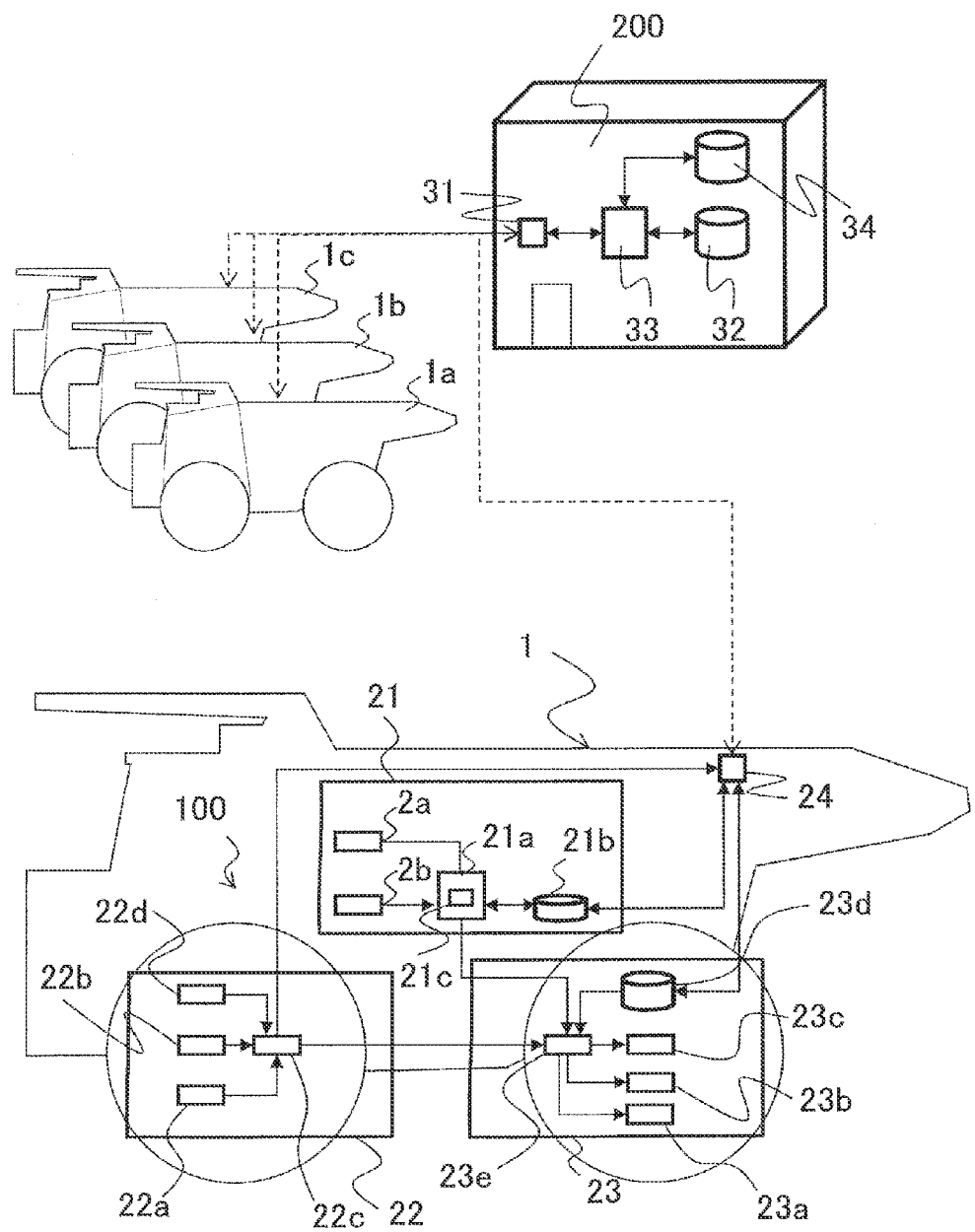
FIG. 13 is a schematic view showing a road shoulder-detecting system according to a fourth embodiment of the present invention.

FIG. 13 is a schematic view of a road shoulder-detecting system according to a fourth embodiment of the present invention. The difference of the fourth embodiment from the first embodiment is that whereas in the first embodiment the information on the road shoulder shape measured by one vehicle 1 is sent to the traffic control center 200, in the fourth embodiment pieces of information on the road shoulder shape measured by a plurality of vehicles 1, 1a to 1c are sequentially sent to the traffic control center 200. In the fourth embodiment, the elements which are the same as or equivalent to those in the first embodiment are designated by the same reference signs.

In the fourth embodiment, as shown in FIG. 13, the self-position measuring device 22 as well as the road shoulder-detecting device 21 and vehicle body motion control device 23 are mounted in each vehicle 1, and the information concerning orientation α of the vehicle 1 relative to the road shoulder B and distance D from the vehicle 1 to the road shoulder B which are measured, and road shoulder shape information such as information on the detected positions of road shoulder detection points Pa, Pb in an external coordinate system are sent to the communication device 31 in the traffic control center 200 through the communication device 24. Similarly the other vehicles 1a to 1c are also provided with the road shoulder-detecting device 21, self-position measuring device 22, vehicle body motion control device 23, and communication device 24, and the information on the road shoulder shape measured by the vehicles 1a to 1c is sent to the traffic control center 200 through the communication device 24.

In the traffic control center 200, the road shoulder shape comparison device 33 compares the road shoulder shape information sent from the vehicles 1, 1a to 1c with the road shoulder shape map stored in the road shoulder data memory unit 32 and if it is found by comparison by the road shoulder shape comparison device 33 that the road shoulder shape information is different from the road shoulder shape map, the road shoulder shape change information in the road shoulder shape information is stored in a change data memory unit 34.

As explained above, in the fourth embodiment, the vehicles 1, 1a to 1c are provided with the road shoulder-detecting device 21, self-position measuring device 22, vehicle body motion control device 23, and communication device 24 so that according to the road shoulder shape information sent from the vehicles 1, 1a to 1c, the road shoulder shape change information representing the difference from the road shoulder shape map stored in the road shoulder data memory unit 32 is stored in the change data memory unit 34 to update the road shoulder shape map sequentially.

Fifth Embodiment

Figure 14:
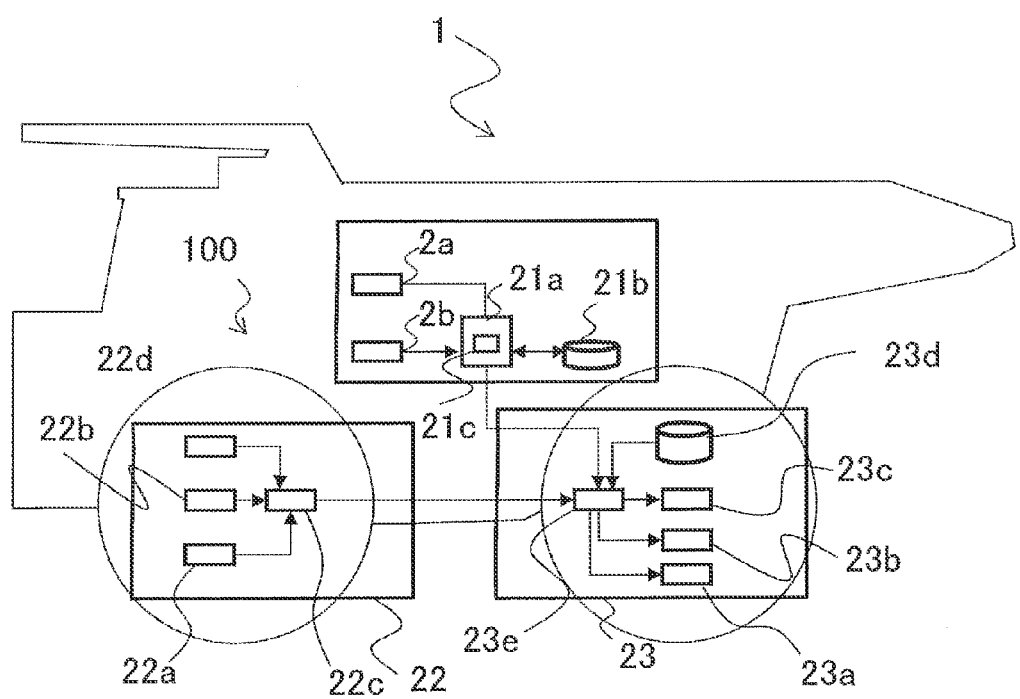
FIG. 14 is a schematic view showing a road shoulder-detecting system according to a fifth embodiment of the present invention.

FIG. 14 is a schematic view showing a road shoulder-detecting system 100 according to a fifth embodiment of the present invention. The difference of the fifth embodiment from the fourth embodiment is that whereas in the fourth embodiment the information on the road shoulder shape measured by the vehicle 1 is sent to the traffic control center 200, in the fifth embodiment the information on the measured road shoulder shape is used in the vehicle 1 without being sent to the traffic control center 200. In the fifth embodiment, the elements which are the same as or equivalent to those in the first embodiment are designated by the same reference signs.

In the fifth embodiment, as shown in FIG. 14, the road shoulder-detecting device 21, self-position measuring device 22, and vehicle body motion control device 23 which constitute the road shoulder-detecting system 100, except the communication device 24, are mounted on the vehicle 1. When the orientation α of the vehicle 1 relative to the road shoulder B and the distance D from the vehicle 1 to the road shoulder B which are calculated by the road shoulder-measuring device 21a change continuously within a prescribed range, the detected positions of the road shoulder detection points Pa, Pb in the external coordinate system as calculated by the road shoulder-measuring device 21a are compared with the road shoulder data stored in the road shoulder memory unit 21b and if there is a difference, the road shoulder data is updated.

The vehicle control device 23e decides whether or not the traveling position of the vehicle 1 is out of a given predetermined traveling range, on the basis of the orientation α of the vehicle 1 relative to the road shoulder B and the distance D from the vehicle 1 to the road shoulder B which are calculated by the road shoulder-measuring device 21a and if out of the given traveling range, it controls the drive torque limiting device 23b and steering control device 23c appropriately to bring the traveling position of the vehicle 1 within the given traveling range. If the vehicle control device 23e decides that the traveling position of the vehicle 1 is out of the given predetermined traveling range, an alarm (not shown) provided on the driver seat 1b may give a warning to the operator by means of sound, light or the like.

As explained above, in the fifth embodiment, when the orientation α of the vehicle 1 relative to the road shoulder B and the distance D from the vehicle 1 to the road shoulder B which are calculated by the road shoulder-measuring device 21a change continuously within the prescribed range, the detected positions of the road shoulder detection points Pa, Pb in the external coordinate system as calculated by the road shoulder-measuring device 21a are compared with the road shoulder data stored in the road shoulder memory unit 21b and if there is a difference, the road shoulder data is updated.

Furthermore, since the vehicle control device 23e controls the traveling position of the vehicle 1 on the basis of the orientation α of the vehicle 1 relative to the road shoulder B and the distance D from the vehicle 1 to the road shoulder B which are calculated by the road shoulder-measuring device 21a, the vehicle control device 23e can control autonomous traveling of the vehicle 1 more appropriately and accurately.

Sixth Embodiment

Figure 15A:
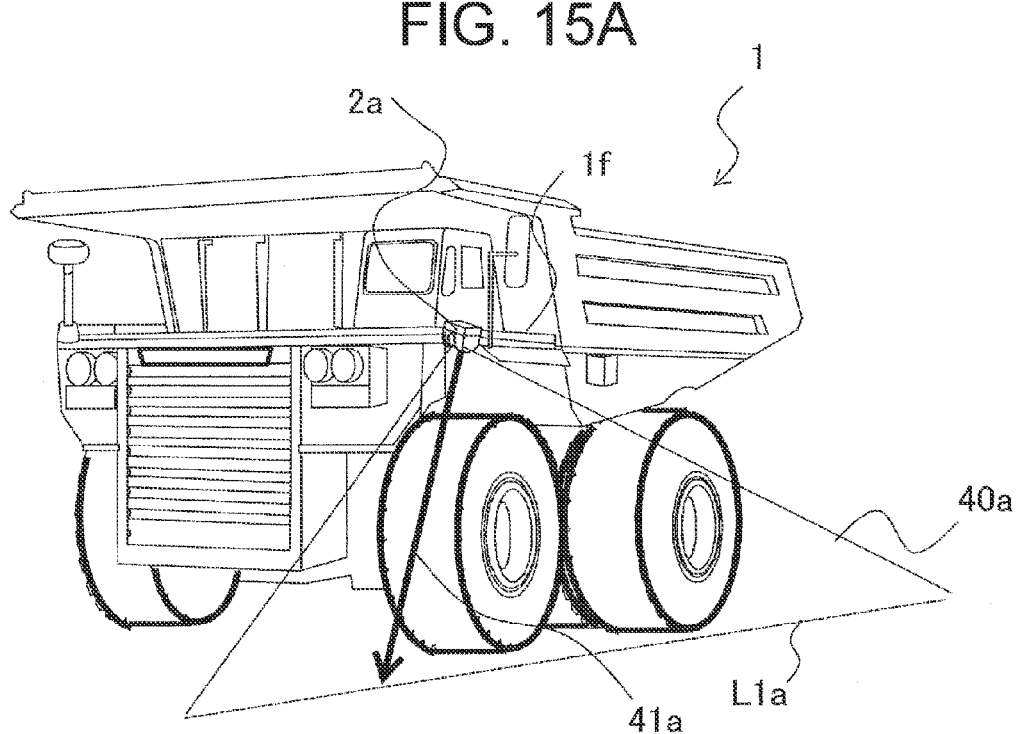
FIG. 15 is a schematic view showing a road shoulder-detecting unit during low speed traveling of a transportation vehicle for mining according to a sixth embodiment of the present invention, in which (a) is an overall view of the transportation vehicle for mining, and (b) is a fragmentary enlarged view of the road shoulder-detecting unit.

FIG. 15 is a schematic view showing a road shoulder-detecting unit during low speed traveling of a vehicle 1 according to a sixth embodiment of the present invention, in which (a) is an overall view of the vehicle 1, and (b) is a fragmentary enlarged view of the road shoulder-detecting unit 2a. FIG. 16 is a schematic view showing the road shoulder-detecting unit 2a during high speed traveling of the vehicle 1, in which (a) is an overall view of the vehicle 1 and (b) is a fragmentary enlarged view of the road shoulder-detecting unit 2a. FIG. 17 is a schematic plan view showing the scanning directions of the road shoulder-detecting units 2a, 2b of the vehicle 1. In FIG. 15(a) and FIG. 16(a), the road shoulder-detecting unit 2b is omitted.

The difference of the sixth embodiment from the second embodiment is that whereas in the second embodiment the road shoulder-detecting units 2a, 2b are fixed on the upper deck 1f and the scanning directions of the road shoulder-detecting units 2a, 2b are fixed, in the sixth embodiment the road shoulder-detecting units 2a, 2b are movable so that their scanning directions can be changed. In the sixth embodiment, the elements which are the same as or equivalent to those in the second embodiment are designated by the same reference signs.

<Structure>

Figure 15B:
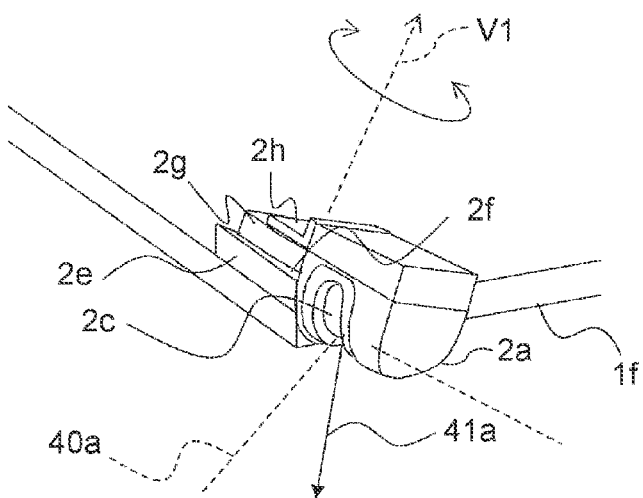
Figure 16A:
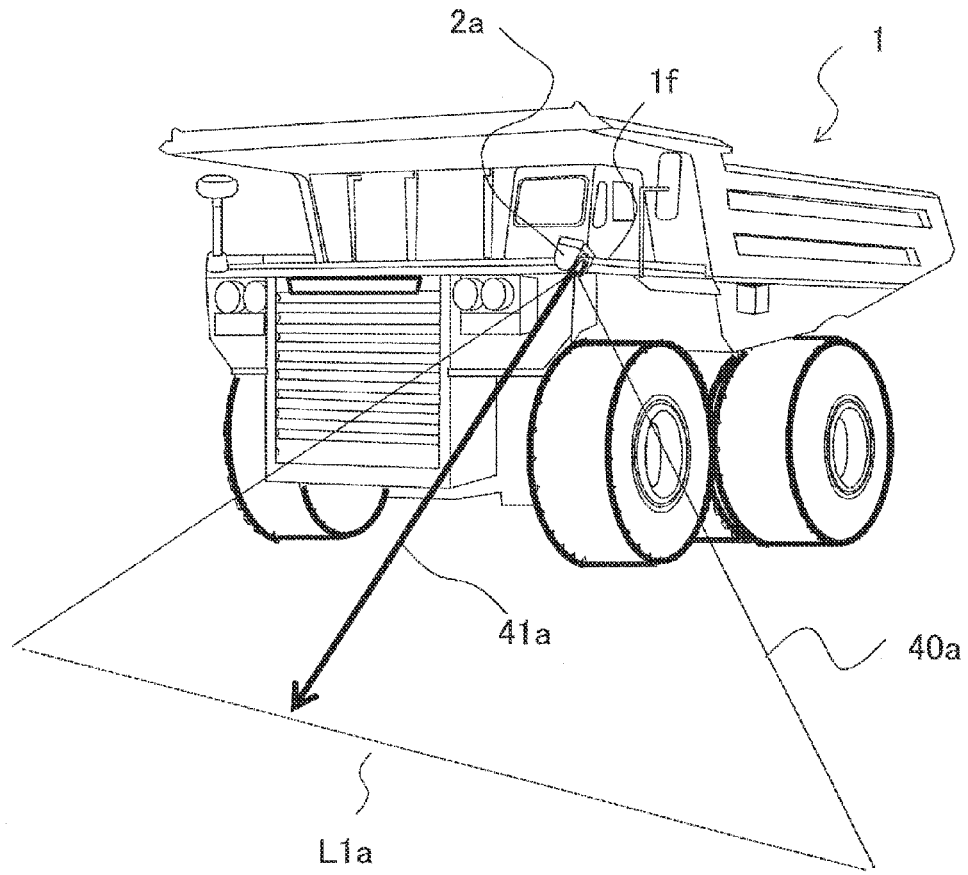
FIG. 16 is a schematic view showing the road shoulder-detecting unit during high speed traveling of the transportation vehicle for mining, in which (a) is an overall view of the transportation vehicle for mining and (b) is a fragmentary enlarged view of the road shoulder-detecting unit.
Figure 16B:
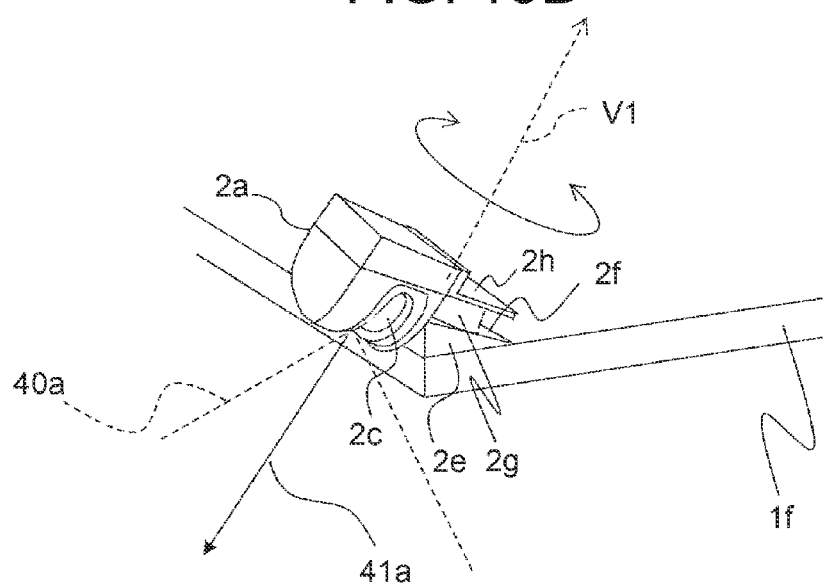
Figure 17:
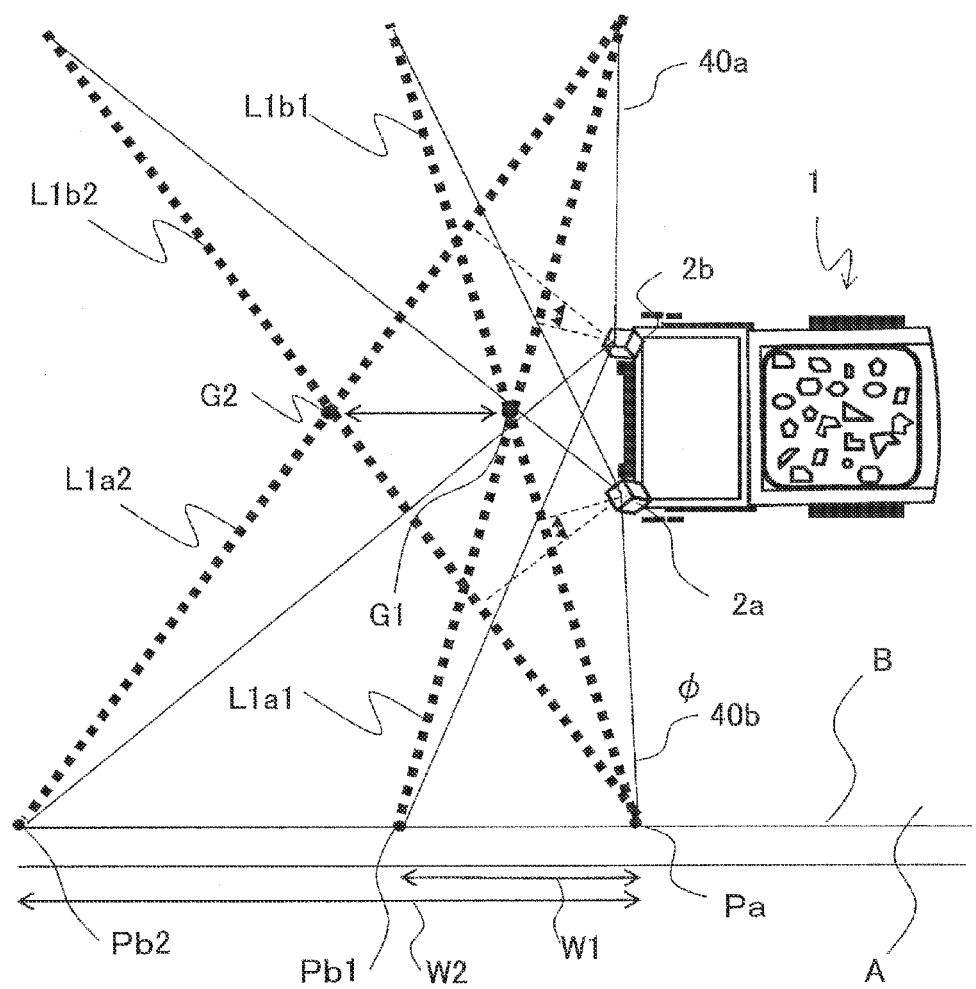
FIG. 17 is a schematic plan view showing the scanning directions of the road shoulder-detecting units of the transportation vehicle for mining.

In the sixth embodiment, as shown in FIG. 15(b) and FIG. 16(b), an axis tilting member 2e, triangular in a side view, is attached to the upper side of the front corner of the upper deck 1f. The axis tilting member 2e has a tilted surface 2f which is tilted down from the front side of the upper deck 1f to its rear side. A drive mechanism 2g is mounted on the tilted surface 2f, as a scanning direction changing part to change the direction in which the road shoulder-detecting unit 2a scans the road surface A. The drive mechanism 2g has almost the shape of a flat plate, and a support member 2h, which is in the shape of a flat plate fixed on the road shoulder-detecting unit 2a, is mounted on the upper surface of the drive mechanism 2g. The support member 2h is rotatably mounted on the drive mechanism 2g, with its vertical axis tilted toward the rear of the vehicle on the upper side as rotation axis V1. The road shoulder-detecting unit 2a is mounted in a manner that its scanning plane 40a is vertically tilted at the same angle as the tilting angle of the tilted surface 2f of the axis tilting member 2e. Therefore, the road shoulder-detecting unit 2a is structured so that the scanning plane 40a of the road shoulder-detecting unit 2a can be changed in a range from a position along the front-back direction as shown in FIG. 15(a) and FIG. 15(b) to a position along the widthwise direction of the road surface A as shown in FIG. 16(a) and FIG. 16(b) by rotating the support member 2h using the drive mechanism 2g. The road shoulder-detecting unit 2b is structured in the same way.

The vehicle control device 23e calculates the travel speed of the vehicle 1 from the rotation speed of the front wheel 1d detected by the wheel speed measuring unit 22a and controls the rotation of the drive mechanism 2g according to the calculated travel speed. Specifically, if the calculated travel speed is lower than a given predetermined speed, as shown in FIG. 17, the vehicle control device 23e rotates the support members 2h inwards by the drive mechanisms 2g so that the intersection point G1 of intersection lines L1a1 and L1b1 where the scanning planes 40a, 40b by the road shoulder-detecting units 2a, 2b intersect the road surface A shifts toward the front side in the traveling direction or backward. Also, if the calculated travel speed is higher than the given predetermined speed, the vehicle control device 23e rotates the support members 2h outwards by the drive mechanisms 2g so that the intersection point G2 of intersection lines L1a2 and L1b2 where the scanning planes 40a, 40b by the road shoulder-detecting units 2a, 2b intersect the road surface A shifts further ahead in the traveling direction or forward.

<Effects>

Generally, when the travel speed of the vehicle 1 is low, for example, it may be a case that the vehicle 1 travels in an area where the travel speed should be decreased, such as a bend, slope or uneven road surface and it is necessary to detect the position and orientation of the road shoulder B adjacent to the vehicle 1 accurately and prevent contact with the road shoulder B or the like properly. On the other hand, when the travel speed of the vehicle 1 is high, it may be a case that it travels on a flat road surface A along a straight track and it is necessary to detect the road shoulder forward in the traveling direction in a wider area rather than the position and orientation of the road shoulder B adjacent to the vehicle 1.

Therefore, in the sixth embodiment, if the travel speed of the vehicle 1 based on the rotation speed of the front wheel 1d as detected by the wheel speed measuring unit 22a is lower than the given predetermined speed, the vehicle control device 23e controls each drive mechanism 2g to shift the intersection point G1 of the intersection line L1a1 on the road surface A by the road shoulder-detecting unit 2a and the intersection line L1b1 on the road surface A by the road shoulder-detecting unit 2b toward the front side of the vehicle 1 in the traveling direction. As a consequence, distance W1 between the road shoulder detection point Pa detected by the road shoulder-detecting unit 2a and the road shoulder detection point Pb1 detected by the road shoulder-detecting unit 2b is decreased, so a portion of the road shoulder B which is adjacent to the vehicle 1 can be detected with higher accuracy. Furthermore, if the travel speed of the vehicle 1 based on the rotation speed of the front wheel 1d detected by the wheel speed measuring unit 22a is higher than the given predetermined speed, the vehicle control device 23e controls each drive mechanism 2g to shift the intersection point G2 of the intersection line L1a2 on the road surface A by the road shoulder-detecting unit 2a and the intersection line L1b2 on the road surface A by the road shoulder-detecting unit 2b forward in the traveling direction of the vehicle 1. As a consequence, distance W2 between the road shoulder detection point Pa detected by the road shoulder-detecting unit 2a and the road shoulder detection point Pb2 detected by the road shoulder-detecting unit 2b is increased, so road shoulder detection can be made considering the road shoulder B in a wider area. Therefore, road shoulder detection can be made appropriately according to the travel speed of the vehicle 1 and autonomous traveling of the vehicle 1 can be controlled more appropriately.

Other Embodiments

The present invention is not limited to the above embodiments but it includes other various modified embodiments. For example, the above embodiments have been described for easy understanding of the present invention and the present invention is not limited to embodiments which include all the elements described above.

Furthermore, in the above embodiments, an autonomous travel type off-road dump truck for mining has been described as an example of the vehicle 1 but the road shoulder-detecting system 100 according to the present invention may also be mounted on a manned dump truck to be operated by an operator or another type of vehicle 1 to perform road shoulder detection.

In the above embodiments, two road shoulder-detecting unit 2a, 2b are spaced and installed at the same distance from the center of the front side of the vehicle 1a in the left-right direction; however, the road shoulder-detecting units 2a, 2b may be installed anywhere in which the distance to the road shoulder B can be detected. The road shoulder-detecting units 2a, 2b have been described on the assumption that they are laser scanners; however, they may be any units that can detect the distance to the road shoulder B, other than laser scanners.

Figure 18A:
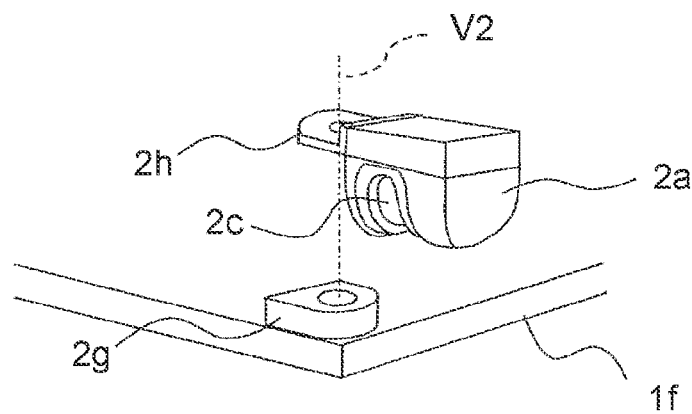
FIG. 18 is a fragmentary enlarged view of a road shoulder-detecting unit of a transportation vehicle for mining according to a seventh embodiment of the present invention, in which (a) is an exploded view, (b) is a view showing a state at high speed, and (c) is a view showing a state at low speed.
Figure 18B:
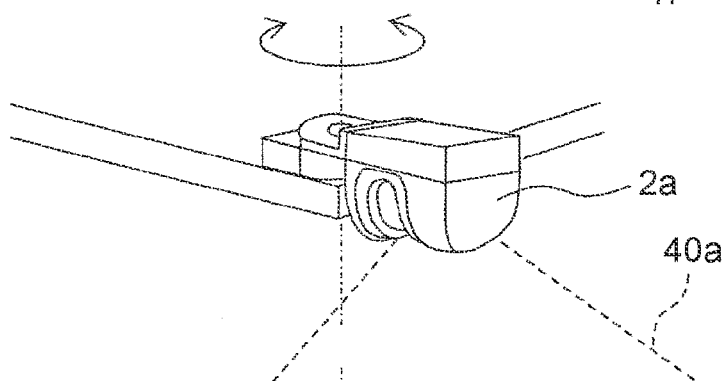
Figure 18C:
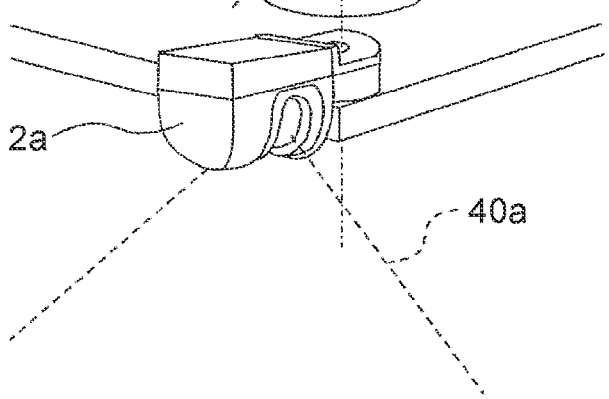

Furthermore, in the sixth embodiment, the drive mechanisms 2g are mounted on the axis tilting members 2e to tilt the scanning planes 40a, 40b of the road shoulder-detecting units 2a, 2b so that the scanning planes 40a, 40b are shifted for a distance when the road shoulder-detecting units 2a, 2b are rotated by the drive mechanisms 2g; however, instead, in the seventh embodiment shown in FIG. 18(a) to FIG. 18(c), the drive mechanism 2g may be mounted on the upper side of the front corner of the upper deck 1f with a vertical axis as rotation axis V2. In this case, by rotating the support member 2h by the drive mechanism 2g horizontally, the scanning plane 40a of the road shoulder-detecting unit 2a can be changed from the front-back direction shown in FIG. 18(b) to the left-right direction shown in FIG. 18(c). Therefore, the intersection point G of the intersection line L1a on the road surface A by the road shoulder-detecting unit 2a and the intersection line L1b on the road surface A by the road shoulder-detecting unit 2b can be shifted along the traveling direction of the vehicle 1, although the distance of shift of the scanning plane 40a of the road shoulder-detecting unit 2a is smaller than in the sixth embodiment.

The sixth embodiment adopts a two-step switching method in which a given predetermined speed is used as a reference and if the travel speed of the vehicle 1 is lower than the given speed, the intersection point G of the intersection lines L1a, L1b of the road shoulder-detecting units 2a, 2b is shifted toward the front side of the vehicle 1 in the traveling speed and if the travel speed of the vehicle 1 is higher than the given speed, the intersection point G of the intersection lines L1a, L1b of the road shoulder-detecting units 2a, 2b is shifted forward in the traveling direction; however, instead, a linear switching method in which the position of the intersection point G is linearly changed according to the travel speed of the vehicle 1 or a multi-step method in which it is changed in steps according to the travel speed of the vehicle 1 may be adopted.

Figure 19:
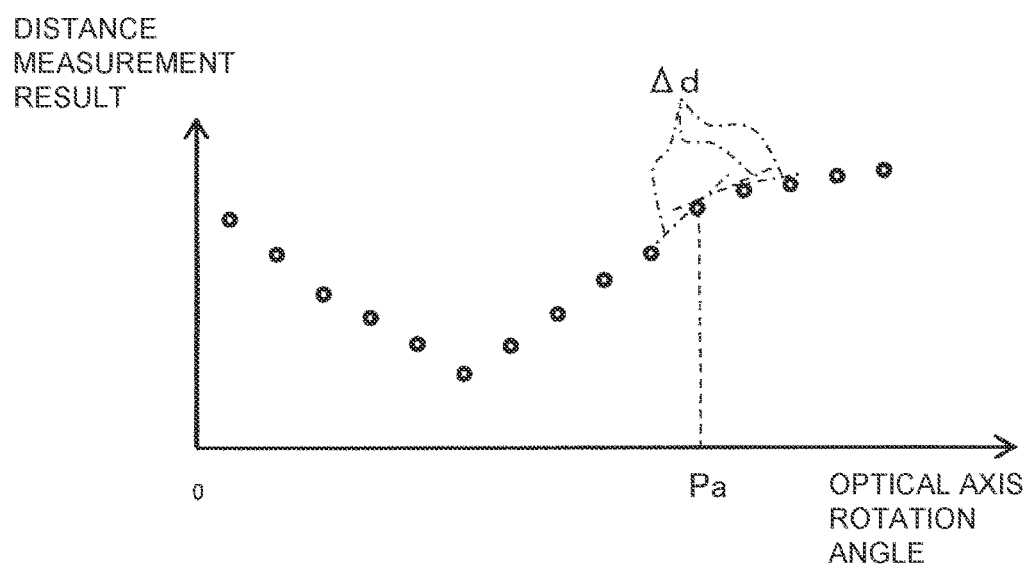
FIG. 19 is a view of a profile showing distance measurement results versus optical axis rotation angle in a transportation vehicle for mining according to an eighth embodiment of the present invention.

Furthermore, in the sixth embodiment, in order to detect the road shoulder B, road shoulder detection points Pa, Pb are found by calculating intersection lines L1, L2 as shown in FIG. 5; however, instead, the road shoulder-detecting units 2a, 2b may associate the optical axis rotation angles with distance measurement results at the rotation angles (distance between the road shoulder-detecting units 2a, 2b and measuring points) to find road shoulder detection points Pa, Pb on the basis of change in the distance change rate. FIG. 19 is a view of a profile showing distance measurement results versus optical axis rotation angle in a vehicle 1 according to an eighth embodiment of the present invention. As shown in FIG. 11, when the road shoulder-detecting units 2a, 2b perform scanning with the optical axis shifted from Ni−1 through Ni to Ni+1, the measuring point comes closer to the vehicle 1 (distance represents a decreasing function), and after it comes closest to the vehicle 1, the measuring point goes away from the vehicle 1 (distance represents an increasing function). When the inclined surface of the road shoulder B is irradiated by laser, since the inclined surface of the road shoulder B is higher than the road surface A in the Z axis direction, the distance to the point of intersection with the optical axis (measuring point) decreases according to its height. Thus, in the profile shown in FIG. 19, as the laser-irradiated spot shifts from the road surface A to the road shoulder B, the distance increases gradually. Thus, the point at which the distance increase rate Δd is a positive value and the increase rate decreases may be detected as intersection point P.

REFERENCE SIGNS LIST

1 . . . Vehicle (transportation vehicle for mining),
1a . . . Vehicle body,
1d . . . Front wheel (wheel),
1e . . . Rear wheel (wheel),
2a, 2b . . . Road shoulder-detecting units,
2g . . . Drive mechanism (scanning direction changing part),
21a . . . Road shoulder-measuring device (road shoulder measuring unit),
21b . . . Road shoulder memory unit (memory unit),
21c . . . Comparison unit,
22a . . . Wheel speed measuring unit (speed detecting unit),
23e . . . Vehicle control device (control unit)
40a, 40b . . . Scanning planes,
100 . . . Road shoulder-detecting system

The invention claimed is:

1. A road shoulder-detecting system mounted on a vehicle on a road, the road shoulder-detecting system comprising:
two laser scanners each configured to scan a road surface in front of the vehicle and acquire distance measurement data of the road surface and a road shoulder; and
a calculating device connected to the laser scanner, which is configured to receive the distance measurement data from the laser scanner and measure an orientation of the vehicle relative to the road shoulder and a distance to the road shoulder,
wherein the two laser scanners are disposed on a front portion of the vehicle,
wherein the two laser scanners are each configured to linearly scan the road surface in front of the vehicle at every angle, of a plurality of predetermined angles,
wherein a first scanning line of linearly scanning the road surface of one of the two laser scanners intersects a second scanning line of linearly scanning the road surface of the other of the two laser scanners,
wherein a first irradiation direction of the one laser scanner is perpendicular to the first scan line and a second irradiation direction of the other laser scanner is perpendicular to the second scan line, and
wherein the one laser scanner and the other laser scanner are disposed on the front portion of the vehicle so that the first irradiation direction of the one laser scanner and the second irradiation direction of the other laser scanner are oriented away from each other with respect to a width direction of the vehicle,
wherein the calculating device is configured to:
for each of the two laser scanners, take a point, at which an increase rate of a distance to a respective scanning line on the road calculated based on the distance measurement data detected by the respective laser scanners is a positive value and the increase rate decreases, as a road shoulder measuring point; and measure the orientation of the vehicle relative to the road shoulder and the distance from the vehicle to the road shoulder based on relative positions of two road shoulder measuring points detected by the two laser scanners with respect to the vehicle.

2. The road shoulder-detecting system according to claim 1, further comprising:
a memory configured to store a road shoulder profile of the road as a reference road shoulder profile, wherein
the calculating device is connected to one of the two laser scanners and the memory, and includes a comparator configured to compare the road shoulder profile detected and acquired by the laser scanner with the reference road shoulder profile stored in the memory, and
the calculating device is configured to measure the orientation of the vehicle relative to the road shoulder and the distance to the road shoulder on the basis of comparison by the comparator.

3. The road shoulder-detecting system according to claim 1, wherein
the vehicle has wheels, and
the two laser scanners are disposed higher than respective tops of the wheels of the vehicle.

4. The road shoulder-detecting system according to claim 1, wherein
the calculating device is configured to take an intersection point of a scanning line on the road surface by the laser scanner and a scanning line on an inclined surface of the road shoulder by the laser scanner as a road shoulder measuring point.

5. The road shoulder-detecting system according to claim 4, wherein
the calculating device is configured to measure the orientation of the vehicle relative to the road shoulder and the distance to the road shoulder on the basis of relative positions of two road shoulder measuring points detected by the two laser scanners with respect to the vehicle and the reference road shoulder profile stored in the memory unit.

6. A transportation vehicle for mining comprising:
a vehicle body;
two laser scanners each configured to scan a road surface in front of the vehicle and acquire distance measurement data for the road surface and a road shoulder; and
a calculating device connected to the two laser scanners, which is configured to receive the distance measurement data from the laser scanner and measure an orientation of the vehicle relative to the road shoulder and a distance to the road shoulder,
wherein the two laser scanners are installed on a front portion of the vehicle body,
wherein the two laser scanners are each configured to linearly scan the road surface in front of the vehicle at every angle, of a plurality of predetermined angles,
wherein a first scanning line of linearly scanning the road surface of one of the two laser scanners intersects a second scanning line of linearly scanning the road surface of the other of the two laser scanners, and
wherein a first irradiation direction of the one laser scanner is perpendicular to the first scan line and a second irradiation direction of the other laser scanner is perpendicular to the second scan line, and
wherein the one laser scanner and the other laser scanner are disposed on the front portion of the vehicle so that the first irradiation direction of the one laser scanner and the second irradiation direction of the other laser scanner are oriented away from each other with respect to a width direction of the vehicle,
wherein the calculating device is configured to:
for each of the two laser scanners, take a point, at which an increase rate of a distance to a respective scanning line on the road calculated based on the distance measurement data detected by the respective laser scanners is a positive value and the increase rate decreases, as a road shoulder measuring point; and
measure the orientation of the vehicle relative to the road shoulder and the distance from the vehicle to the road shoulder based on relative positions of two road shoulder measuring points detected by the two laser scanners with respect to the vehicle.

7. The road shoulder-detecting system according to claim 1, the road shoulder detecting system further comprising:
a rotation speed sensor configured to detect a travel speed of the vehicle; and
a controller, wherein
the laser scanners include a support member and a drive mechanism configured to drive rotation of the support member, and
the controller is connected to the rotation seed sensor and the drive mechanism, and is configured to control driving of rotation by the drive mechanism according to the travel speed of the vehicle detected by the rotation speed sensor and shift an intersection point of the first scanning line on the road surface by the one the laser scanners and a second scanning line on the road surface by the other laser scanner in a traveling direction of the vehicle.

8. The road shoulder-detecting system according to claim 1, wherein
the two laser scanners are installed separately from each other on different sides of the vehicle in a vehicle width direction of the vehicle.

* * * * *